United States Patent
Veillette et al.

(10) Patent No.: US 11,964,703 B2
(45) Date of Patent: Apr. 23, 2024

(54) OFF-ROAD VEHICLE HAVING A CARGO BOX WITH A SIDE STORAGE SPACE

(71) Applicant: BOMBARDIER RECREATIONAL PRODUCTS INC., Valcourt (CA)

(72) Inventors: Stephane Veillette, St-Genevieve de Batiscan (CA); Didier Dubois, Sherbrooke (CA); Igor Krucko, Sherbrooke (CA); Jean-Philippe Crepeau, Bromont (CA); Thierry Cotnoir, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 349 days.

(21) Appl. No.: 17/513,267

(22) Filed: Oct. 28, 2021

(65) Prior Publication Data

US 2022/0135145 A1    May 5, 2022

Related U.S. Application Data

(60) Provisional application No. 63/107,524, filed on Oct. 30, 2020.

(51) Int. Cl.
*B62D 33/023* (2006.01)
*B62D 21/18* (2006.01)

(52) U.S. Cl.
CPC ......... *B62D 33/023* (2013.01); *B62D 21/183* (2013.01)

(58) Field of Classification Search
CPC ............................ B62D 33/023; B62D 21/183
See application file for complete search history.

(56) References Cited

U.S. PATENT DOCUMENTS

| | | | | |
|---|---|---|---|---|
| 4,126,349 A | * | 11/1978 | Nelson | B62D 33/02 224/404 |
| 5,267,773 A | * | 12/1993 | Kalis, Jr. | B60R 11/06 296/183.1 |
| 6,237,211 B1 | * | 5/2001 | Clare | B60R 11/06 29/469 |
| 6,786,532 B2 | * | 9/2004 | McNally | B60P 3/14 16/229 |
| 7,686,365 B2 | * | 3/2010 | Thelen | B60R 9/00 296/181.3 |
| 9,499,203 B1 | * | 11/2016 | Finley | B62D 29/043 |
| 11,305,823 B2 | * | 4/2022 | McKinney | B60R 13/01 |
| 2005/0134070 A1 | * | 6/2005 | Plentis | B60R 9/02 296/37.1 |

(Continued)

FOREIGN PATENT DOCUMENTS

| | | | | |
|---|---|---|---|---|
| CA | 3136432 A1 | * | 4/2022 | ........... B62D 21/183 |
| CN | 116654120 A | * | 8/2023 | ........... B62D 33/023 |

*Primary Examiner* — Jacob B Meyer
(74) *Attorney, Agent, or Firm* — BCF LLP

(57) ABSTRACT

An off-road vehicle has a frame, a motor, a plurality of ground engaging members and a cargo box connected to the frame. The cargo box having a floor, a front wall, a left side wall and a right side wall. An inner panel is connected to one of the left and right side walls of the cargo box. The inner panel defines a side storage space on an outer side of the inner panel. An outer panel is removably connected to the inner panel. The outer panel covers the side storage space. The outer panel has an outer periphery, and an integrally formed portion of the inner panel extends outside the outer periphery of the outer panel.

20 Claims, 22 Drawing Sheets

(56) References Cited

U.S. PATENT DOCUMENTS

| | | | | |
|---|---|---|---|---|
| 2012/0256438 A1* | 10/2012 | Watkins | ............... | B60R 11/06 |
| | | | | 296/37.6 |
| 2014/0021232 A1* | 1/2014 | Lazarevich | ............... | B60R 7/04 |
| | | | | 224/539 |
| 2014/0339845 A1* | 11/2014 | Lang | ............... | B60R 9/06 |
| | | | | 296/37.6 |
| 2014/0353956 A1* | 12/2014 | Bjerketvedt | ............... | B60N 2/24 |
| | | | | 296/64 |
| 2015/0375687 A1* | 12/2015 | Gillam | ............... | B60R 11/06 |
| | | | | 296/37.6 |
| 2018/0178677 A1* | 6/2018 | Swain | ............... | F01P 5/02 |
| 2019/0248424 A1* | 8/2019 | McKinney | ............... | B62D 29/04 |
| 2019/0275951 A1* | 9/2019 | Steele | ............... | B60R 9/06 |
| 2022/0135145 A1* | 5/2022 | Veillette | ............... | B62D 33/023 |
| | | | | 180/291 |
| 2022/0289116 A1* | 9/2022 | Cleaves | ............... | B60R 11/06 |
| 2022/0289312 A1* | 9/2022 | Aquila | ............... | B60R 5/02 |

* cited by examiner

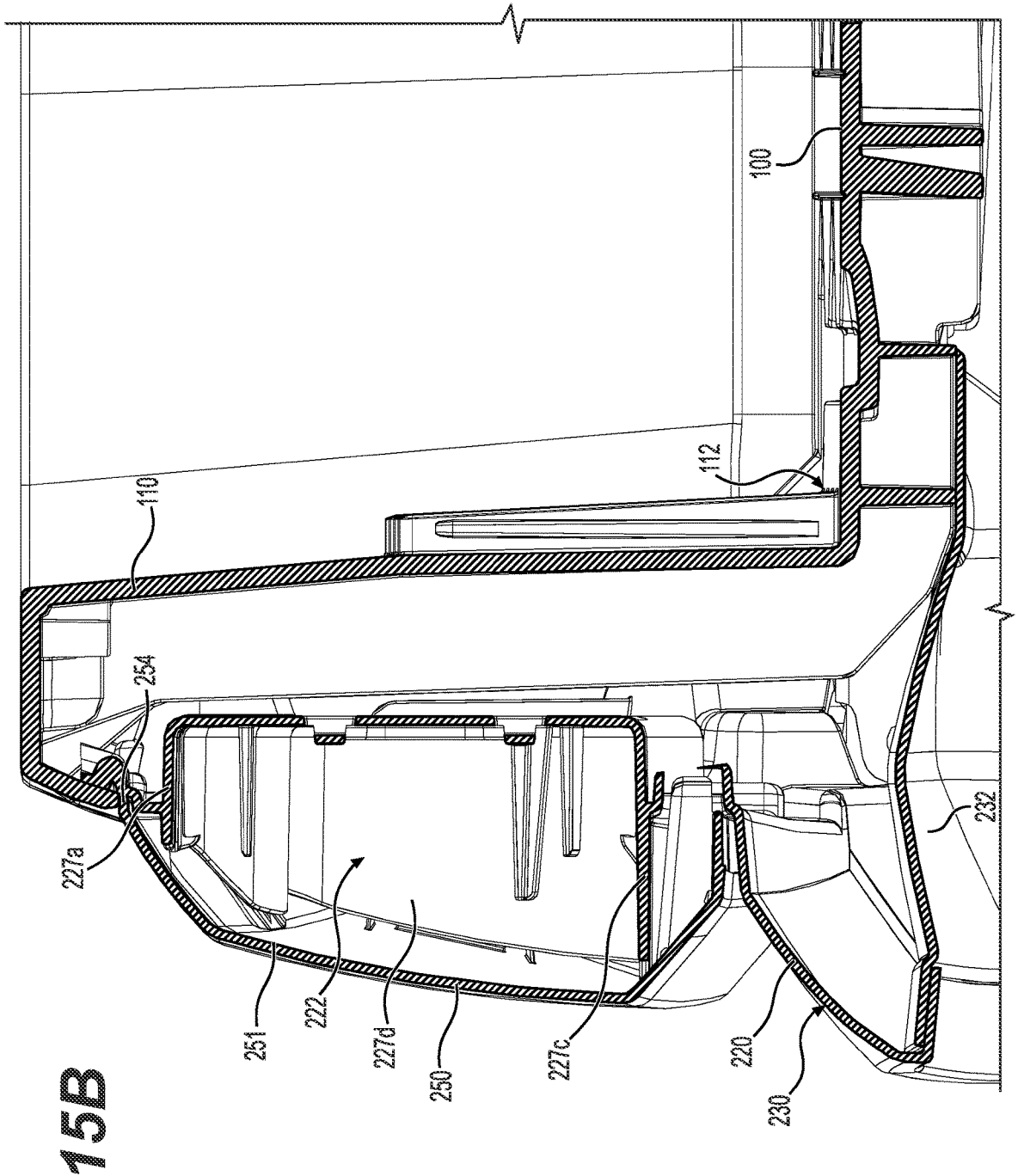

OFF-ROAD VEHICLE HAVING A CARGO BOX WITH A SIDE STORAGE SPACE

CROSS-REFERENCE TO RELATED APPLICATION

The present application claims priority to U.S. Provisional Patent Application Ser. No. 63/107,524, filed Oct. 30, 2020, entitled "Off-Road Vehicle Having a Cargo Box with a Side Storage Space", which is incorporated by reference herein in its entirety.

TECHNOLOGICAL FIELD

The present technology relates to off-road vehicles having a cargo box having a side storage space.

BACKGROUND

Off-road vehicles such as all-terrain vehicles (ATVs), side-by-side off-road vehicles (SSVs), utility-terrain vehicles (UTVs) and the like are used for both utility and recreational purposes. As such, these may be used for transporting cargo and accessories needed for such purposes. It is thus desirable to have storage spaces provided on the off-road vehicle to carry such cargo and accessories.

Therefore, there is a desire for storage spaces for off-road vehicles that permit different accessories and cargo to be carried while the off-road vehicle is being operated.

SUMMARY

It is an object of the present technology to ameliorate at least some of the inconveniences present in the prior art.

In one aspect, the present technology provides an off-road vehicle having a frame, a motor connected to the frame, and a plurality of ground engaging members operatively connected to the frame. At least one ground engaging member of the plurality of ground engaging members is operatively connected to the motor. The off-road vehicle further includes a cargo box connected to the frame. The cargo box has a floor, a front wall extending upwardly from a front end of the floor, a left side wall extending upwardly from a left side of the floor, and a right side wall extending upwardly from a right side of the floor. The cargo box further includes an inner panel connected to one of the left and right side walls. The inner panel defines a side storage space on an outer side of the inner panel. An outer panel is removably connected to the inner panel. The outer panel covers the side storage space. The outer panel has an outer periphery, and an integrally formed portion of the inner panel extends outside the outer periphery of the outer panel.

In some implementations, the outer panel is also connected to the one of the left and right side walls of the cargo box.

In some implementations, the inner panel has a first surface finish in a portion defining the side storage space, and a second surface finish in the integrally formed portion, the first surface finish being different from the second surface finish.

In some implementations, the integrally formed portion of the inner panel extends below the side storage space.

In some implementations, the integrally formed portion of the inner panel extends below the outer panel when the outer panel is connected to the inner panel.

In some implementations, the integrally formed portion of the inner panel is vertically lower than the floor of the cargo box.

In some implementations, the integrally formed portion of the inner panel defines at least in part a fender extending above a rear ground-engaging member of the plurality of ground-engaging members.

In some implementations, the inner panel extends longitudinally in front of and at the rear of the rear ground engaging member of the plurality of ground-engaging members.

In some implementations, the off-road vehicle further includes at least one fastener selectively connecting the outer panel to the one of the left and right side walls of the cargo box.

In some implementations, the inner panel defines a latch aperture, and the off-road vehicle further includes a latch movable between a locked position and an unlocked position. The latch is connected to the outer panel. The latch is engageable in the latch aperture of the inner panel when in the locked position for securing the outer panel to the inner panel.

In some implementations, the latch is resiliently biased toward the locked position.

In some implementations, the latch is a manually operable latch.

In some implementations, a latch access area is defined rearward of the front wall of the cargo box and between the inner panel and the one of the left and right side walls of the cargo box, the latch access area providing access to move the latch between the locked position and the unlocked position.

In some implementations, the latch access area is defined rearward of an air intake grille of the vehicle.

In some implementations, the cargo box further includes a tailgate movable between an open position and a closed position, and the at least one fastener is accessible for being unfastened when the tailgate is in the open position, and the tailgate prevents access to the fastener when in the closed position.

In some implementations, the inner panel has at least one tab aperture defined therein. The outer panel further includes at least one tab engageable in the at least one tab aperture of the inner panel. The at least one tab aperture and the at least one tab are configured such that in order to disconnect the outer panel from the inner panel, the outer panel is moved to disengage the at least one tab from the at least one tab aperture of the inner panel before the outer panel is pulled away from the inner panel.

In some implementations, the at least one tab aperture and the at least one tab are configured such that in order to disengage the at least one tab from the at least one tab aperture, the outer panel is moved rearward.

In some implementations, the at least one tab aperture and the at least one tab are configured such that the at least one tab is disengaged from the at least one tab aperture by forward motion of the outer panel.

In some implementations, the cargo box further includes at least one fastener selectively connecting the outer panel to the one of the left and right side walls of the cargo box, and the latch, the at least one fastener and the at least one tab are provided on the outer panel so as to be located on each side of the side storage space when the outer panel is connected to the inner panel.

In some implementations, the cargo box is pivotally connected to the frame of the vehicle, the cargo box being pivotable between a lowered position and a raised position.

In some implementations, the inner panel defines a recess adapted for receiving a light assembly of the off-road vehicle.

In some implementations, the inner panel further includes an accessory holder in the side storage space for receiving an accessory.

In some implementations, the accessory holder is integrally formed with the inner panel.

In some implementations, the accessory holder includes at least one of a belt holder, a booster cable holder, and a tool holder.

In some implementations, the inner panel is an inner left panel. The side storage space is a left side storage space. The outer panel is an outer left panel. The one of the left and right side walls is the left side wall of the cargo box, and the cargo box further includes an inner right panel connected to the right side wall of the cargo box. The inner right panel defines a right side storage space on an outer side of the inner right panel. An outer right panel is removably connected to the inner right panel. The outer right panel covers the right side storage space. The outer right panel having an outer periphery, and an integrally formed portion of the inner right panel extends outside the outer periphery of the outer right panel.

In some implementations, the inner right panel further includes a right accessory holder in the right side storage space.

In some implementations, the right accessory holder is integrally formed with the inner right panel.

In some implementations, the outer right panel is also connected to the right side wall of the cargo box.

In some implementations, the frame defines at least in part a cockpit area and a power pack area, the power pack area being disposed rearward of the cockpit area, and the motor is disposed in the power pack area.

In some implementations, the off-road vehicle further includes a driver seat connected to the frame and disposed in the cockpit area, the driver seat being disposed at least in part on a first side of a longitudinal center plane of the vehicle, and a passenger seat connected to the frame and disposed in the cockpit area, the passenger seat being disposed at least in part on a second side of the longitudinal center plane of the vehicle.

For purposes of the present application, terms related to spatial orientation when referring to a vehicle and components in relation to the vehicle, such as "forwardly", "rearwardly", "left", "right", "top", "bottom", "upper", "lower" "above" and "below", are as they would be understood by a driver of the vehicle sitting therein in an upright driving position, with the vehicle steered straight-ahead.

Should there be any discrepancies in the definitions of terms in this application and the definition of these terms in any document included herein by reference, the definition of such terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15B is an enlarged view of portion 15B of FIG. 15A;

DETAILED DESCRIPTION

Figure 1:
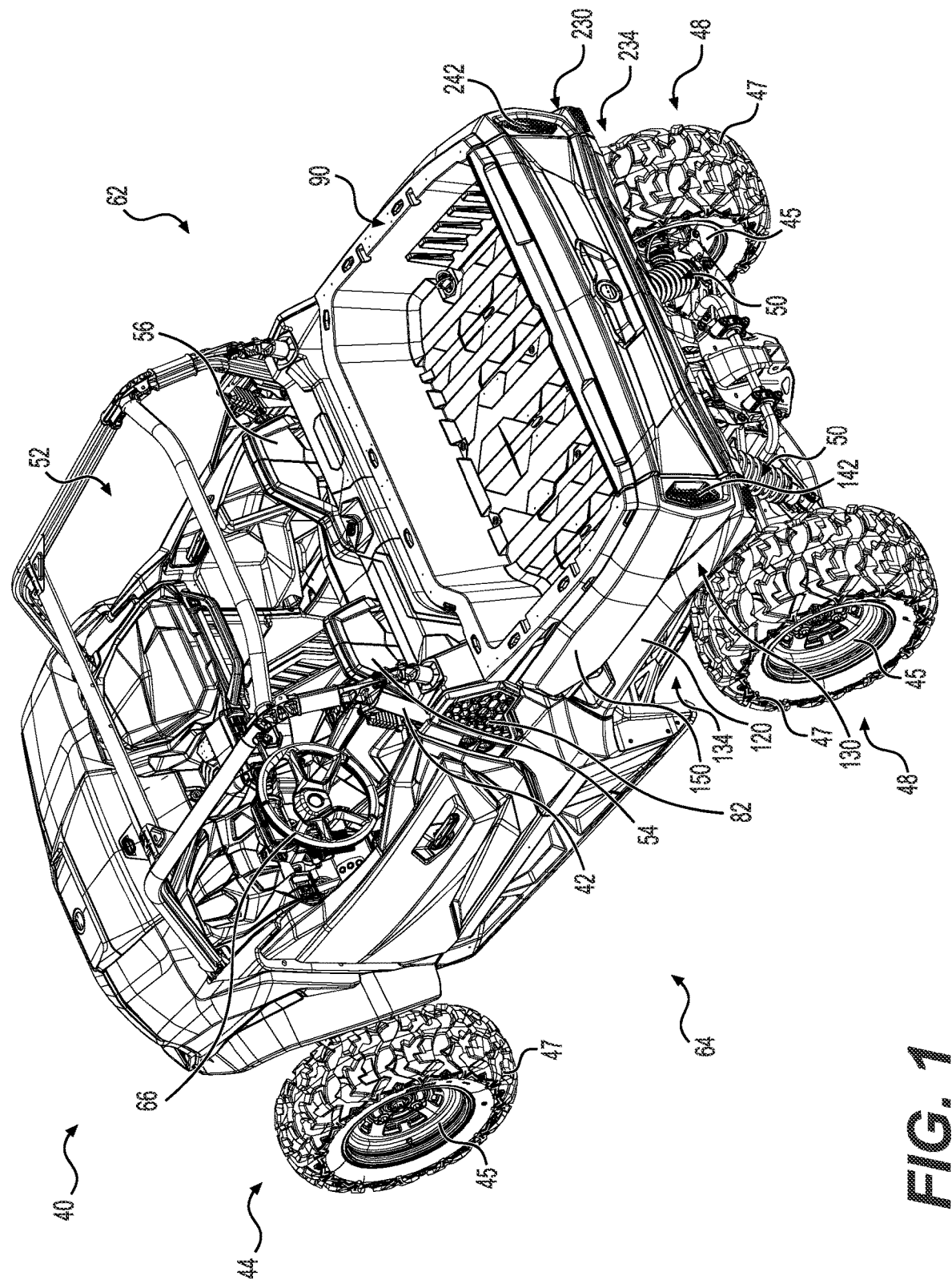
FIG. 1 is a perspective view taken from a top, rear, left side of a side-by-side vehicle (SSV), with a rear cargo box.

Referring to FIGS. 1 to 5, the present technology will be described with reference to a side-by-side off-road vehicle 40. Other types of off-road vehicle incorporating the present technology are contemplated, such as all-terrain vehicles (ATV) and utility terrain vehicle (UTV). The vehicle 40 has a frame 42, two front wheels 44 connected to a front of the frame 42 by front suspension assemblies 46, and two rear wheels 48 connected to the frame 42 by rear suspension assemblies 50. The suspension assemblies 46, 50 are pivotally connected to the frame 42. Each one of the front and rear wheels 44, 48 has a rim 45 and a tire 47 thereon. The rims 45 and tires 47 of the front wheels 44 may differ in size from the rims and tires of the rear wheels 48.

Ground engaging members other than wheels 44, 48 are contemplated for the vehicle 40, such as tracks or skis. In addition, although four ground engaging members are illustrated in the accompanying Figures, the vehicle 40 could include more or less than four ground engaging members. Furthermore, different combinations of ground engaging members, such as tracks used in combination with skis, are contemplated.

Figure 2:
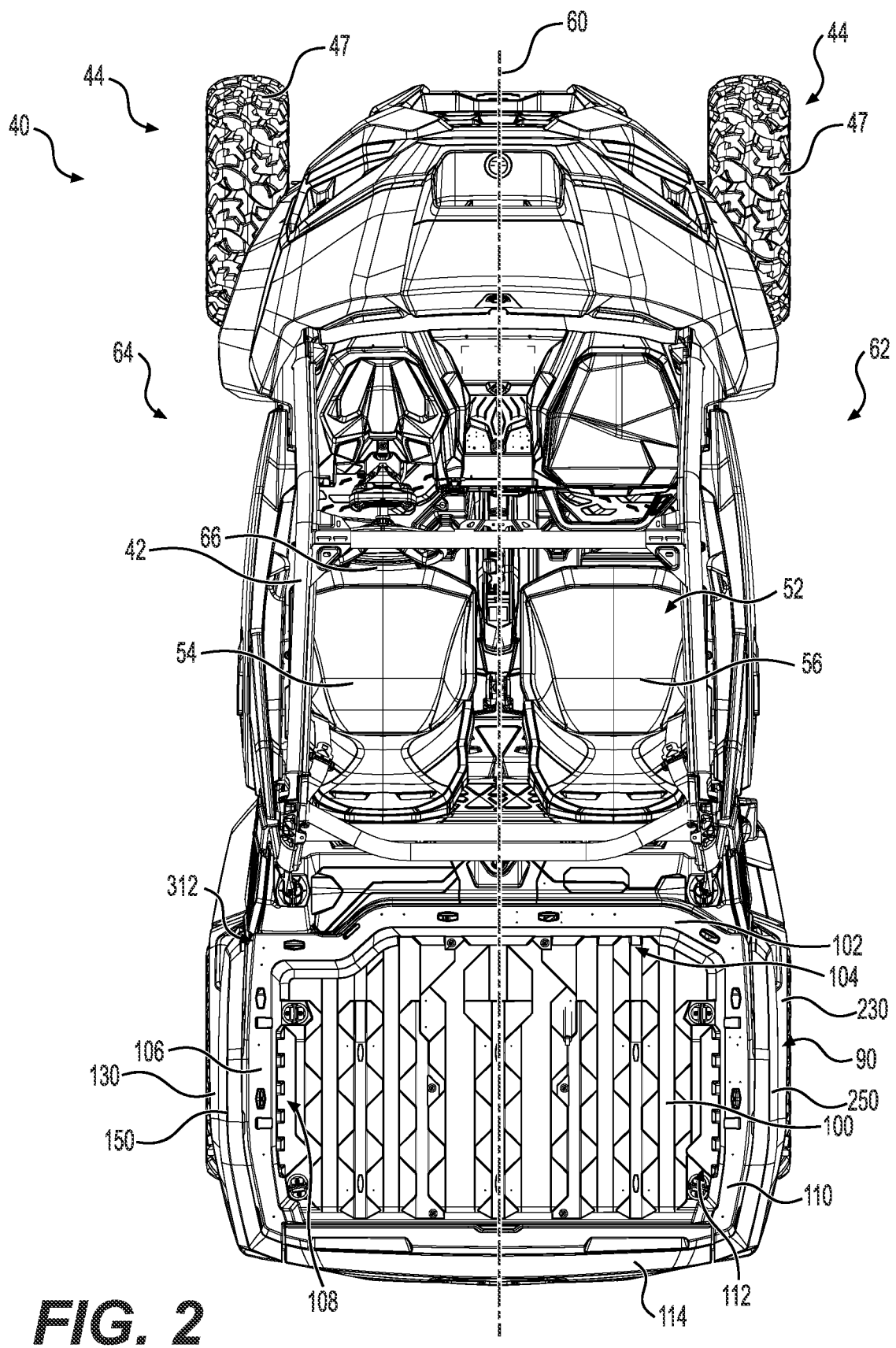
FIG. 2 is a top plan view of the vehicle of FIG. 1.

The frame 42 defines a central cockpit area 52 inside which are disposed a driver seat 54 and a passenger seat 56. In the present implementations, the driver seat 54 is disposed on a left side of the vehicle 40 and the passenger seat 56 is disposed on a right side of the vehicle 40. The driver seat 54 and the passenger seat 56 could be portions of a bench seat (not shown) further including a central seat portion. The vehicle 40 has a longitudinal center plane 60 (FIG. 2). The right side of the longitudinal center plane 60 corresponds to a passenger side 62 of the vehicle 40, while the left side of the longitudinal center plane 60 corresponds to a driver side 64 of the vehicle 40. However, it is contemplated that the driver seat 54 could be disposed on the right side of the longitudinal center plane 60 and that the passenger seat 56 could be disposed on the left side of the longitudinal center plane 60.

Figure 3:
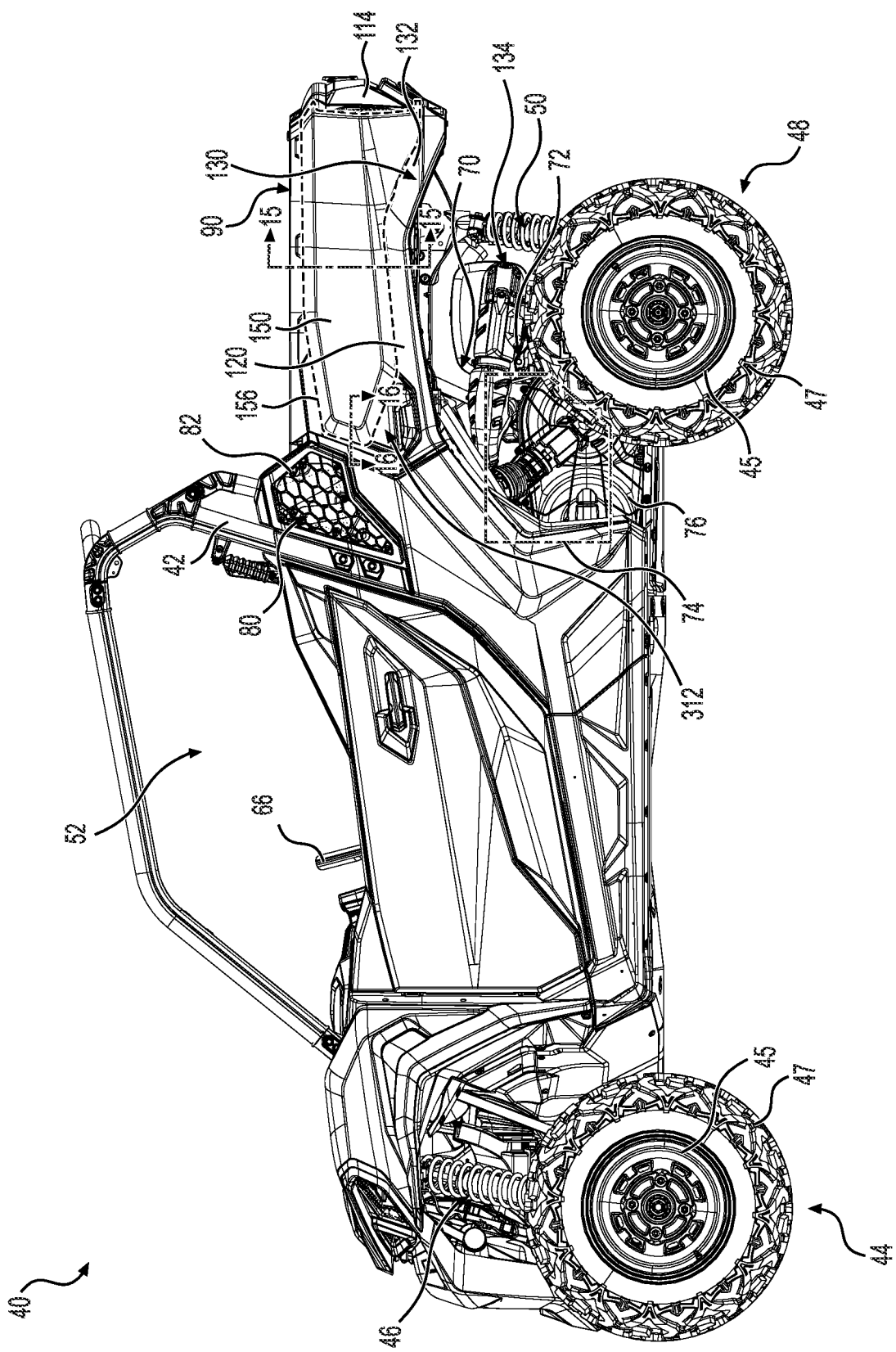
FIG. 3 is a left side elevation view of the vehicle of FIG. 1.
Figure 4:
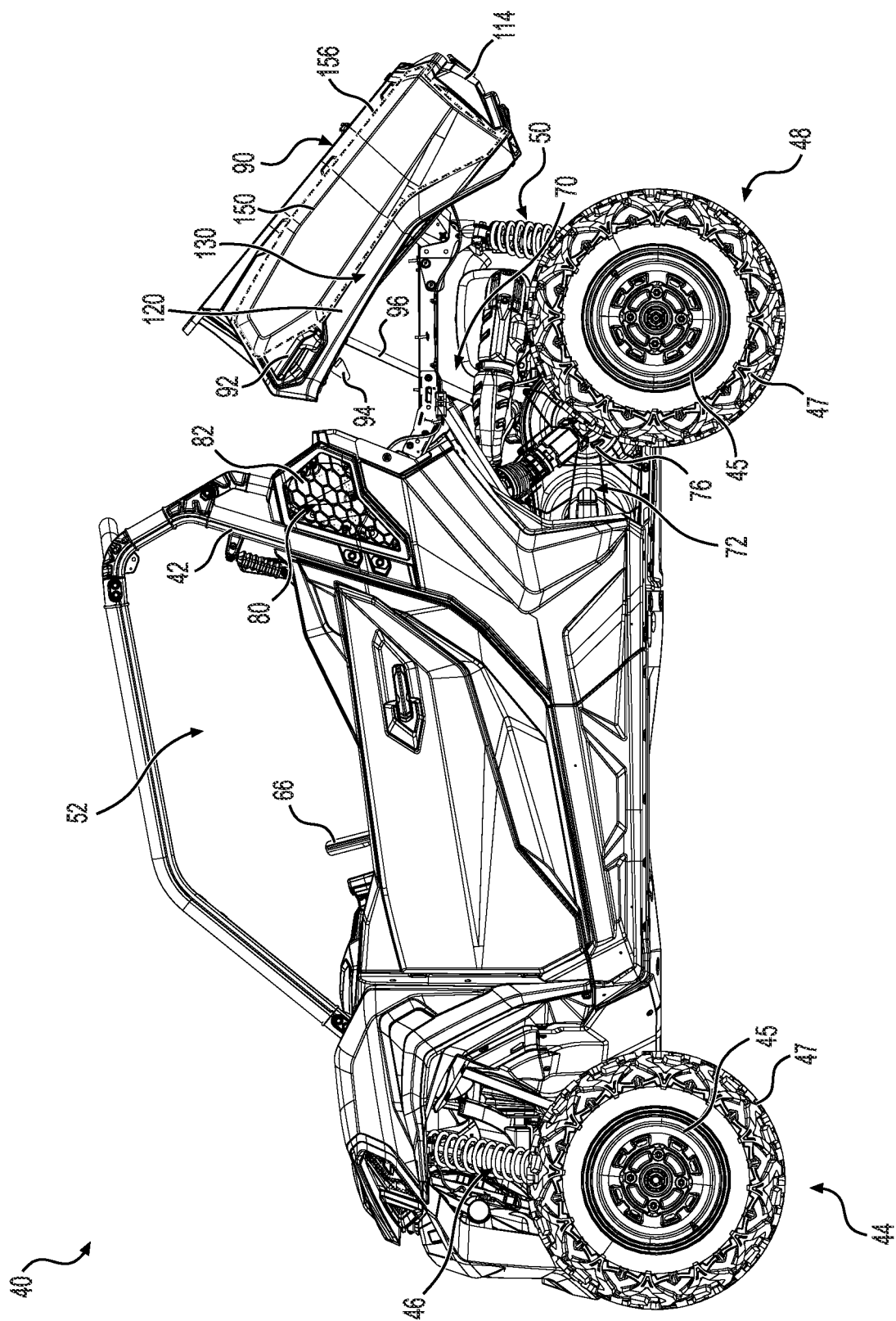
FIG. 4 is a left side elevation view of the vehicle of FIG. 1, with the rear cargo box pivoted in the raised position.
Figure 5:
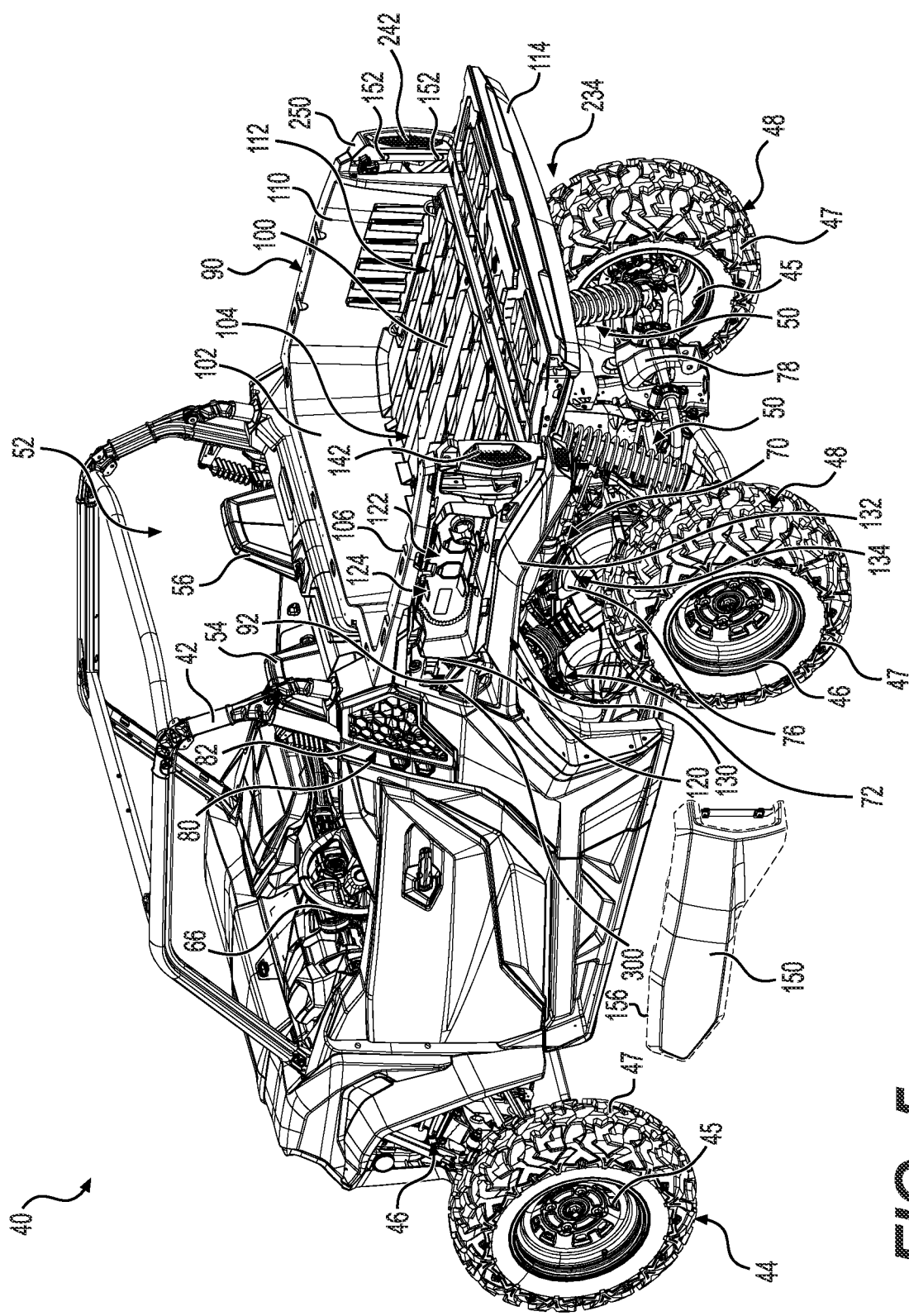
FIG. 5 is a partially exploded, perspective view taken from a top, rear, left side of the vehicle of FIG. 1, with an outer left panel of the rear cargo box being disconnected from an inner left panel of the rear cargo box, and with the tailgate of the cargo box being open.

Still referring to FIGS. 1 to 5, a steering wheel 66 is disposed in front of the driver seat 54. The steering wheel 66 is used to turn the front wheels 44 to steer the vehicle 40. With reference to FIGS. 3 to 5, the frame 42 also defines a power pack area 70 rearward of the cockpit area 52. A power pack 72 is connected to the frame 42 in the power pack area 70. The power pack 72 includes an internal combustion engine 74 (schematically shown in FIG. 3) connected to a continuously variable transmission (CVT) 76 disposed on a left side of the engine 74 (FIGS. 3 to 5). The CVT 76 is on the driver side 64 of the vehicle 40. The CVT 76 is operatively connected to the front wheels 44 by a front prop shaft and differential (not shown) and to the rear wheels 48 by a transaxle 78 (FIG. 5) to transmit torque from the engine 74 to the front and rear wheels 44, 48 to propel the vehicle 40. It is contemplated that a dual clutch transmission could be used instead of a CVT as well as other known automatic, semiautomatic or manual transmission and subtransmissions. An engine control unit (ECU) (not shown) electronically controls different parameters and operating conditions of the engine 74 and of several components of the power pack 72. The power pack 72 also includes an air intake system 80 operatively connected to power pack 72. Air intake grilles 82 are provided on either sides of the vehicle 40, rearward of the cockpit area 52. In the present implementation, the left air intake grille 82 provides air to the CVT 76, and the right air intake grille provides air to the engine 74. In other implementations, the power pack 72 includes at least one electric motor, power electronics module and a battery pack in replacement of or in complement of the internal combustion engine 74. The at least one electric motor is disposed in the power pack area 70 and is operatively connected to at least one of the ground engaging members to propel the vehicle 40.

Referring to FIGS. 1 to 5, the vehicle 40 further includes a cargo box 90 disposed above the power pack area 70. The cargo box 90 is pivotally connected to the frame 42, and is pivotable between a lowered position shown in FIGS. 1 to 3 and 5, and a raised position shown in FIG. 4. Levers 92 are provided on the left and right sides of the cargo box 90 and are connected to a cargo box lock 94 (FIG. 4). When the cargo box 90 is in the lowered position and any one of the levers 92 is actuated, the cargo box lock 94 is unlocked from the frame 42 and the cargo box 90 is pivotable towards the raised position. A gas strut 96 is pivotally connected between the cargo box 90 and the frame 42 to facilitate the upward motion of the cargo box 90 toward the raised position. When the cargo box 90 is pivoted downwards from the raised position to the lowered position, the cargo box lock 94 engages the frame 42 and the cargo box 90 is locked in the lowered position.

Figure 6:
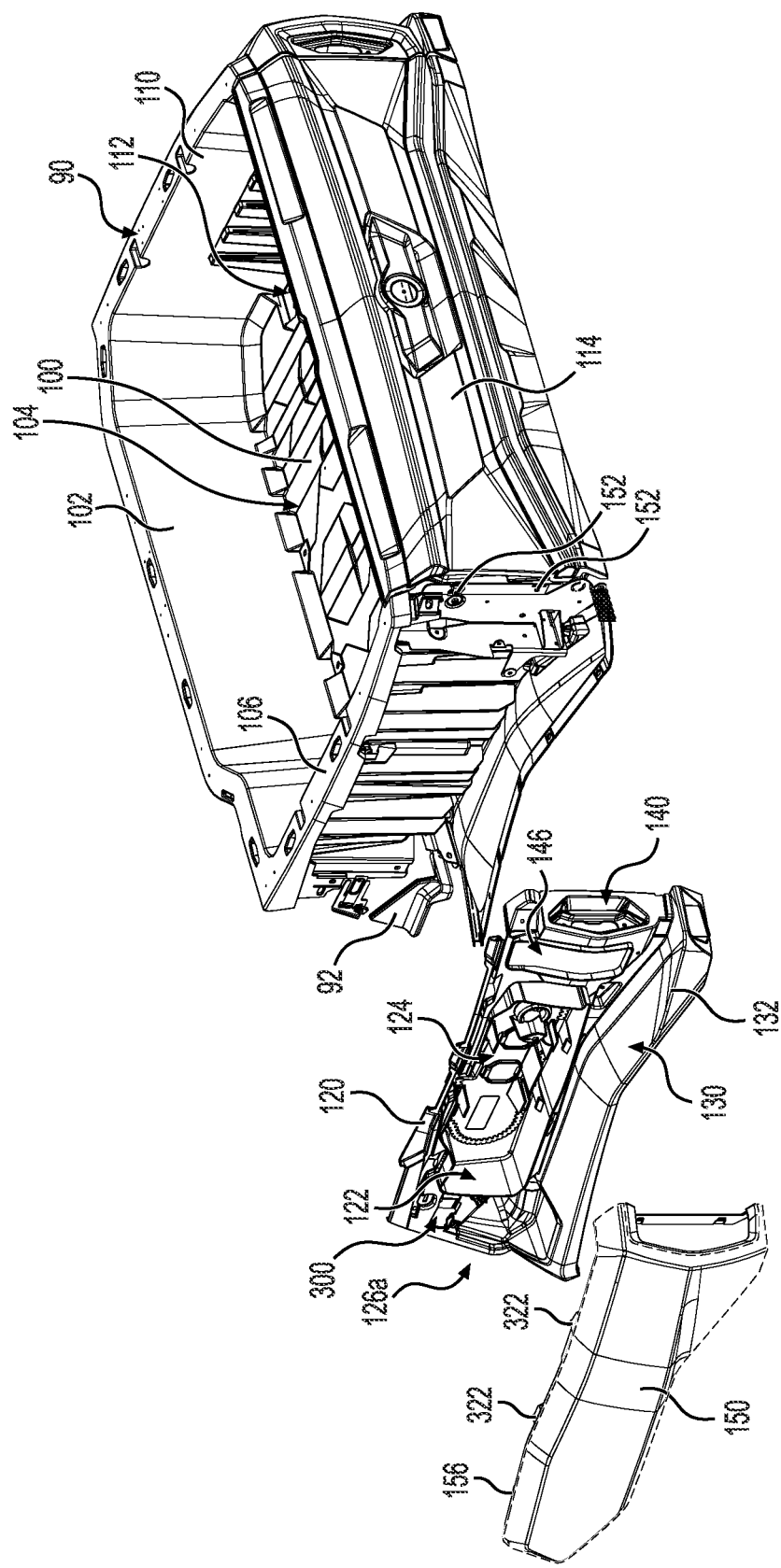
FIG. 6 is a partially exploded, perspective view taken from a top, rear, left side of the rear cargo box of FIG. 1, with the outer left panel and the inner left panel of FIG. 5 being disconnected from the rear cargo box.
Figure 7:
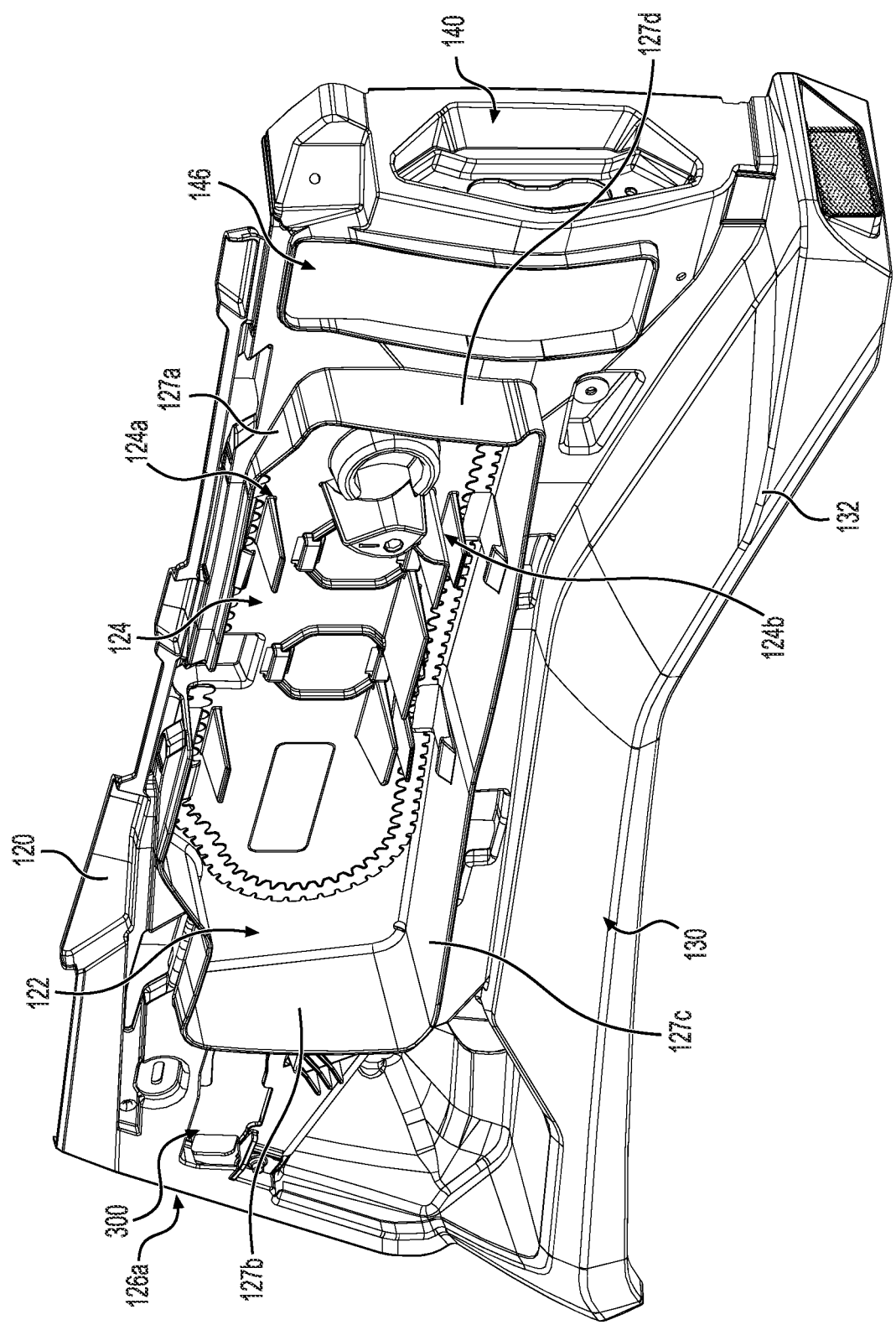
FIG. 7 is a perspective view taken from a top, rear, left side of the inner left panel of the rear cargo box of FIG. 5.

Referring to FIGS. 2, 5 and 6, the cargo box 90 has a floor 100. A front wall 102 extends upwardly from a front end 104 of the floor 100. A left side wall 106 extends upwardly from a left side 108 of the floor 100. A right side wall 110 extends upwardly from a right side 112 of the floor 100. The cargo box 90 further has a tailgate 114 movable between an open position shown in FIG. 5 and a closed position shown in FIG. 6.

Figure 15A:
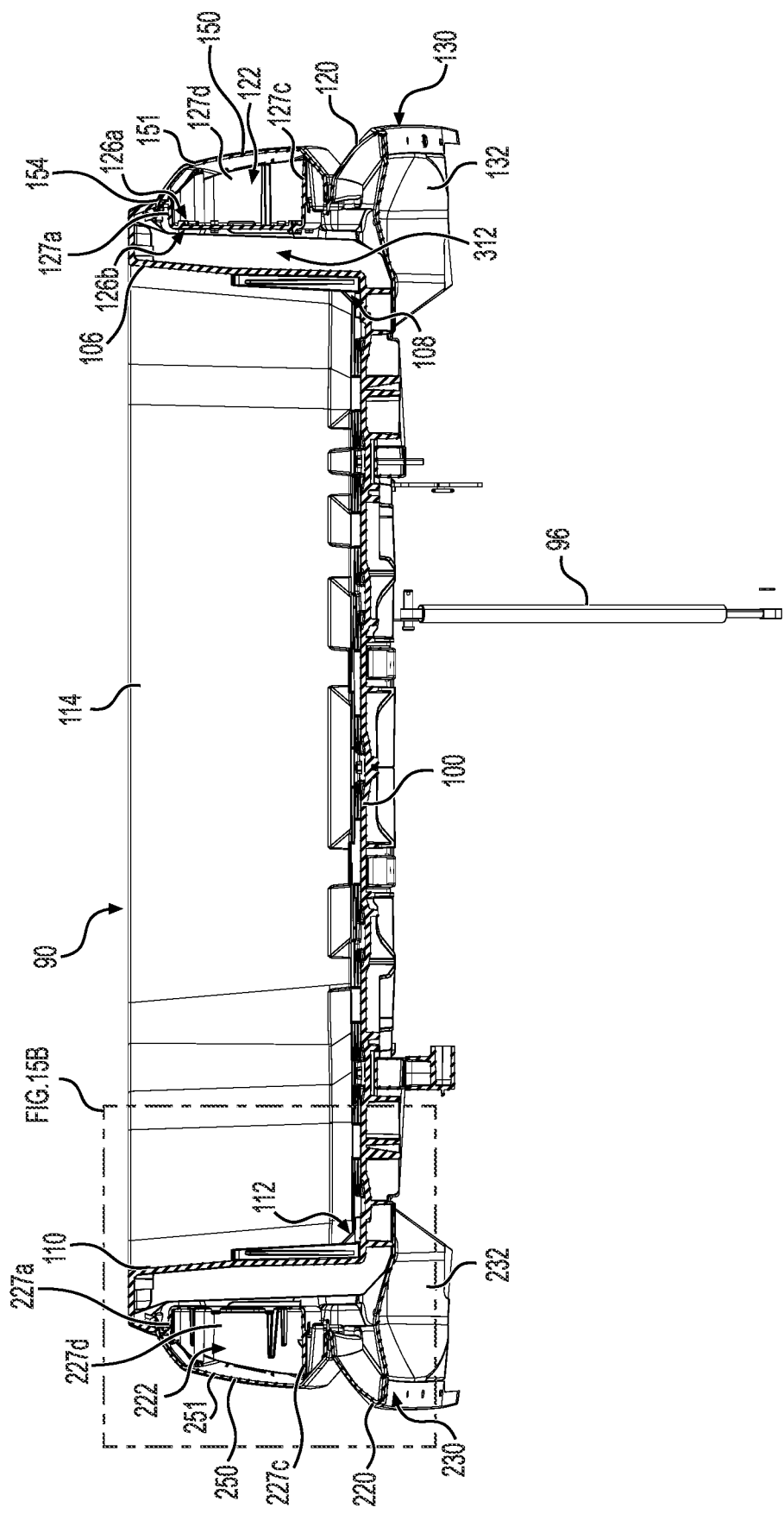
FIG. 15A is a cross-sectional view of the rear cargo box of FIG. 1 taken along cross-section line 15-15 of FIG. 3.

Referring to FIGS. 5 to 8, the cargo box 90 further includes an inner left panel 120 connected to an outer side of the left side wall 106 of the cargo box 90. The inner left panel 120 has a left side storage space 122 defined on an outer side 126a of the inner left panel 120. More particularly, the left side storage space 122 is defined by a top wall 127a, a front wall 127b, a bottom wall 127c, a rear wall 127d projecting outwardly from the outer side 126a of the inner left panel 120 (FIGS. 7 to 9A). The inner left panel 120 further has an accessory holder 124 on the outer side 126a of the inner left panel 120 for receiving an accessory in the left side storage space 122. In the present implementation, the accessory holder 124 is integrally formed with the inner left panel 120, and is adapted to hold a toolkit for the CVT 76 including a CVT belt and a multi-tool. The accessory holder 124 thus includes a belt holder 124a and a tool holder 124b. The inner left panel 120 further has an integrally formed portion 130. The integrally formed portion 130 extends below the left side storage space 122 and the accessory holder 124. The integrally formed portion 130 is also vertically lower than the floor 100 of the cargo box 90 (FIGS. 5 and 15A). In the present implementation, the integrally formed portion 130 defines part of a left fender 132 extending above the left rear wheel 48. In addition, the inner left panel 120 extends longitudinally in front of and at the rear of the left rear wheel 48 as best seen in FIG. 3. The integrally formed portion 130 thus defines a portion of a left wheel well 134 in which the left rear wheel 48 can rotate and move up and down together with the left rear suspension assembly 50. The inner left panel 120 further defines a recess 140 adapted for receiving a left tail light assembly 142 (FIGS. 1 and 5) of the vehicle 40. The recess 140 is defined in a rear face of the inner left panel 120 to receive the left tail light assembly 142. An aperture 146 (FIGS. 6 to 9B) is defined in the inner left panel 120 to access the left tail light assembly 142. For example, should the left tail light assembly 142 need servicing, access is provided thereto through the aperture 146.

Referring to FIGS. 3 to 6, the cargo box 90 further includes an outer left panel 150 removably connected to the inner left panel 120. The connection of the outer left panel 150 to the inner left panel 120 will be described in more details below. The outer left panel 150 is also connected to the left side wall 106 of the cargo box 90 in the present implementation. More particularly, the outer left panel 150 extends around the left tail light assembly 142 and connects to the left side wall 106 at a rear end thereof using two quick release fasteners 152 (FIG. 6). It is to be noted that in order to access the quick release fasteners 152 for unfastening them, the tailgate 114 needs to be moved at least partially in the open position. Conversely, when the tailgate 114 is in the closed position, access to the fasteners 152 is prevented.

Still referring to FIGS. 3 to 6, the outer left panel 150 covers the left side storage space 122 and the accessory holder 124 of the inner left panel 120 when connected thereto, and thus further secures the accessory when received in the accessory holder 124. The left storage space 122 (FIG. 15A) is located laterally outward of the left side wall 106. The left side storage space 122 is suitable to carry the accessory secured in the accessory holder 124 and/or other items. Referring to FIG. 15A, when the outer left panel 150 is connected to the inner left panel 120, an inner side 151 of the outer left panel 150 is in close proximity or in abutment with the outer ends of the top wall 127a, the front wall 127b, the bottom wall 127c and the rear wall 127d of the inner left panel 120 defining the left side storage space 122. Therefore, items disposed in the left side storage space 122 are retained therein by the outer left panel 150, and can lie on the bottom wall 127c when the outer left panel 150 is disconnected from the inner left panel 120. The bottom wall 127c thus acts as a floor of the left side storage space 122. An inner edge 154 (FIG. 15A) of the outer left panel 150 extends laterally inwards beyond the outer ends of the top wall 127a, the front wall 127b, the bottom wall 127c and the rear wall 127d of the inner left panel 120.

The outer left panel 150 has an outer periphery 156 shown in dashed lines in FIGS. 3 to 5. The integrally formed portion 130 of the inner left panel 120 extends outside the outer periphery 156 of the outer left panel 150. More particularly, the integrally formed portion 130 of the inner left panel 120 extends below the outer left panel 150 when the outer left panel 150 is connected to the inner left panel 120. Furthermore, as can be seen in FIG. 2, the integrally formed portion 130 extends further laterally outward than the outer left panel 150.

Figure 9A:
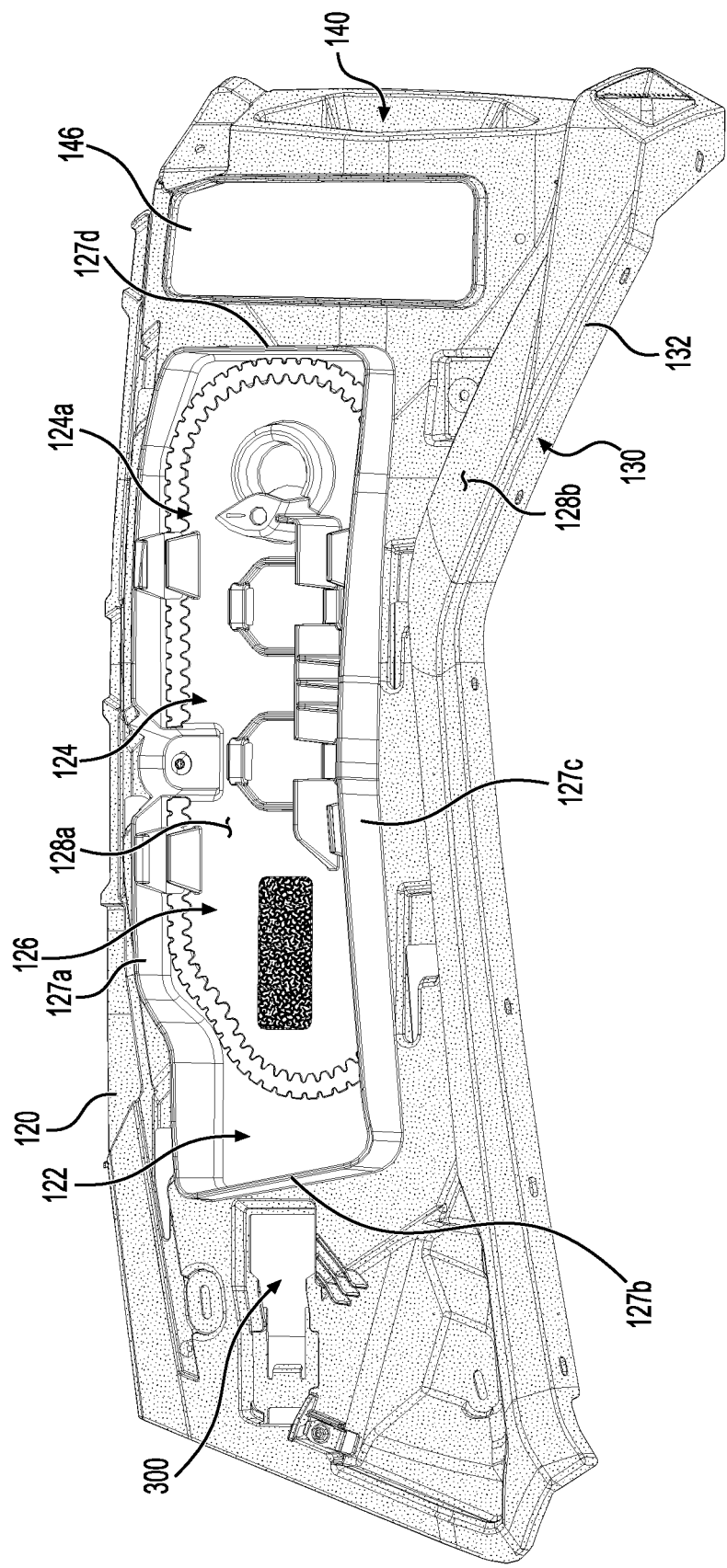
FIG. 9A is a perspective view taken from a bottom, left side of the inner left panel of FIG. 7.
Figure 9B:
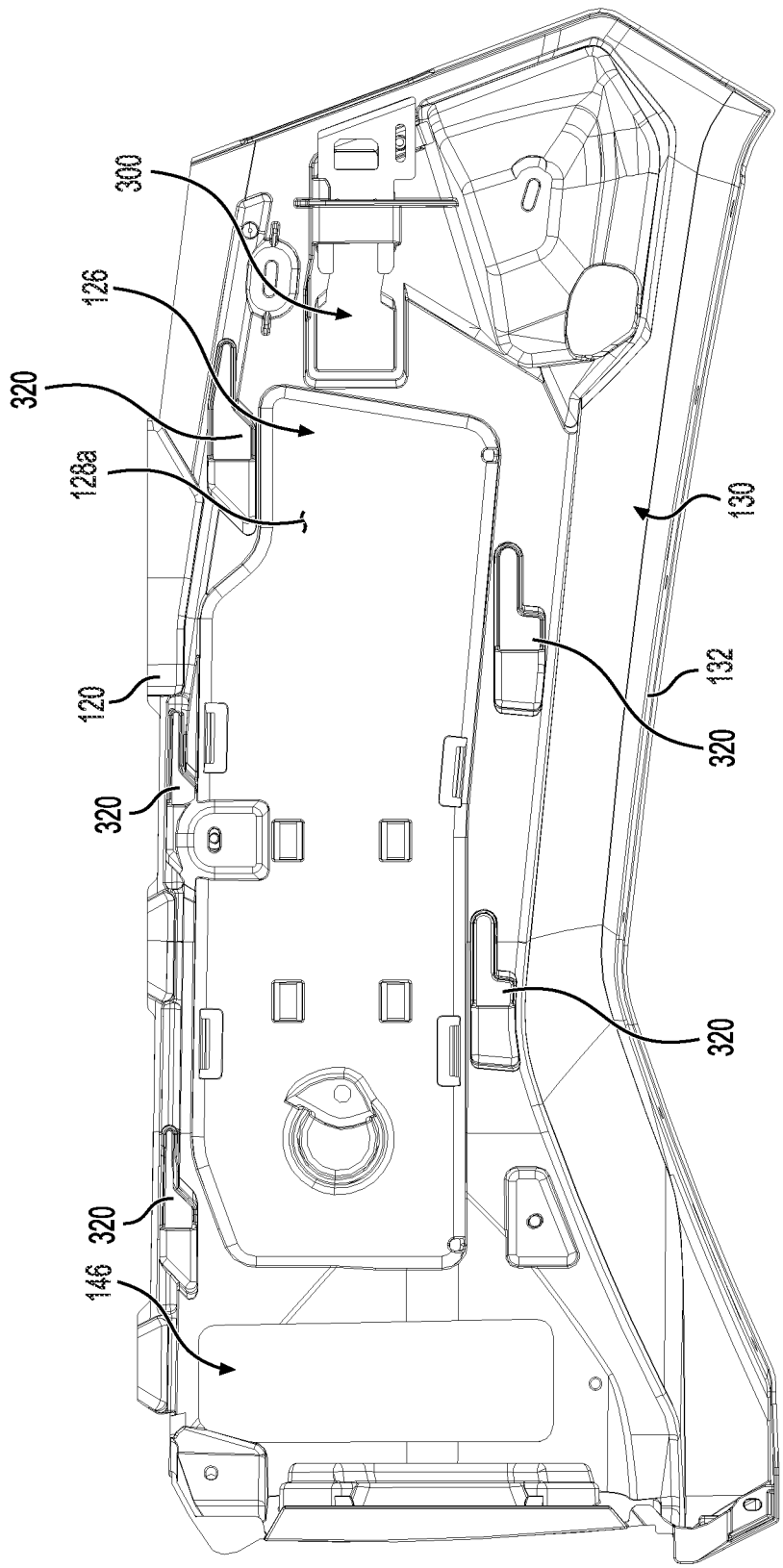
FIG. 9B is a right side elevation view of the inner left panel of FIG. 7.
Figure 9C:
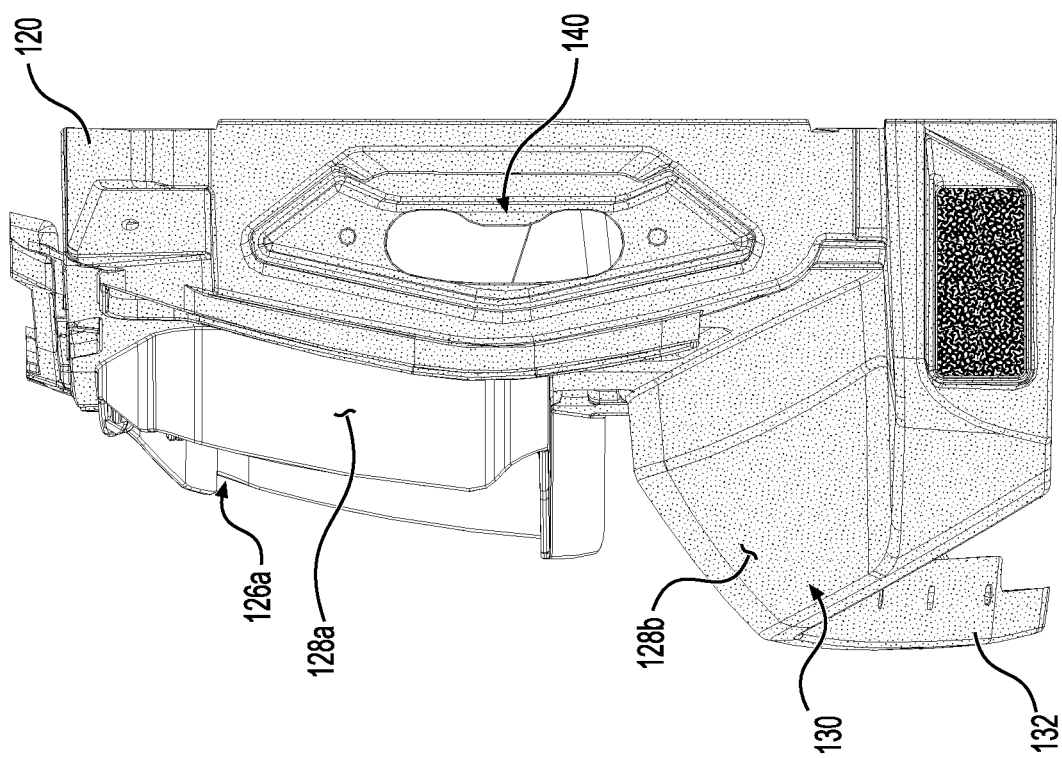
FIG. 9C is a rear view of the inner left panel of FIG. 7.

In the present implementation, the inner left panel 120 and the outer left panel 150 are made of polymeric material using injection molding techniques. Referring to FIGS. 9A to 9C, it is to be noted the portion of the inner left panel 120 defining the accessory holder 124 has a surface finish 128a that is different from a surface finish 128b found in the integrally formed portion 130, but the surface finishes 128a, 128b could be the same in other implementations. In the present implementation, the surface finish 128a is smoother than the surface finish 128b. As seen in FIG. 9B, the inner side 126b of the inner panel 120 also has the surface finish 128a.

Figure 10:
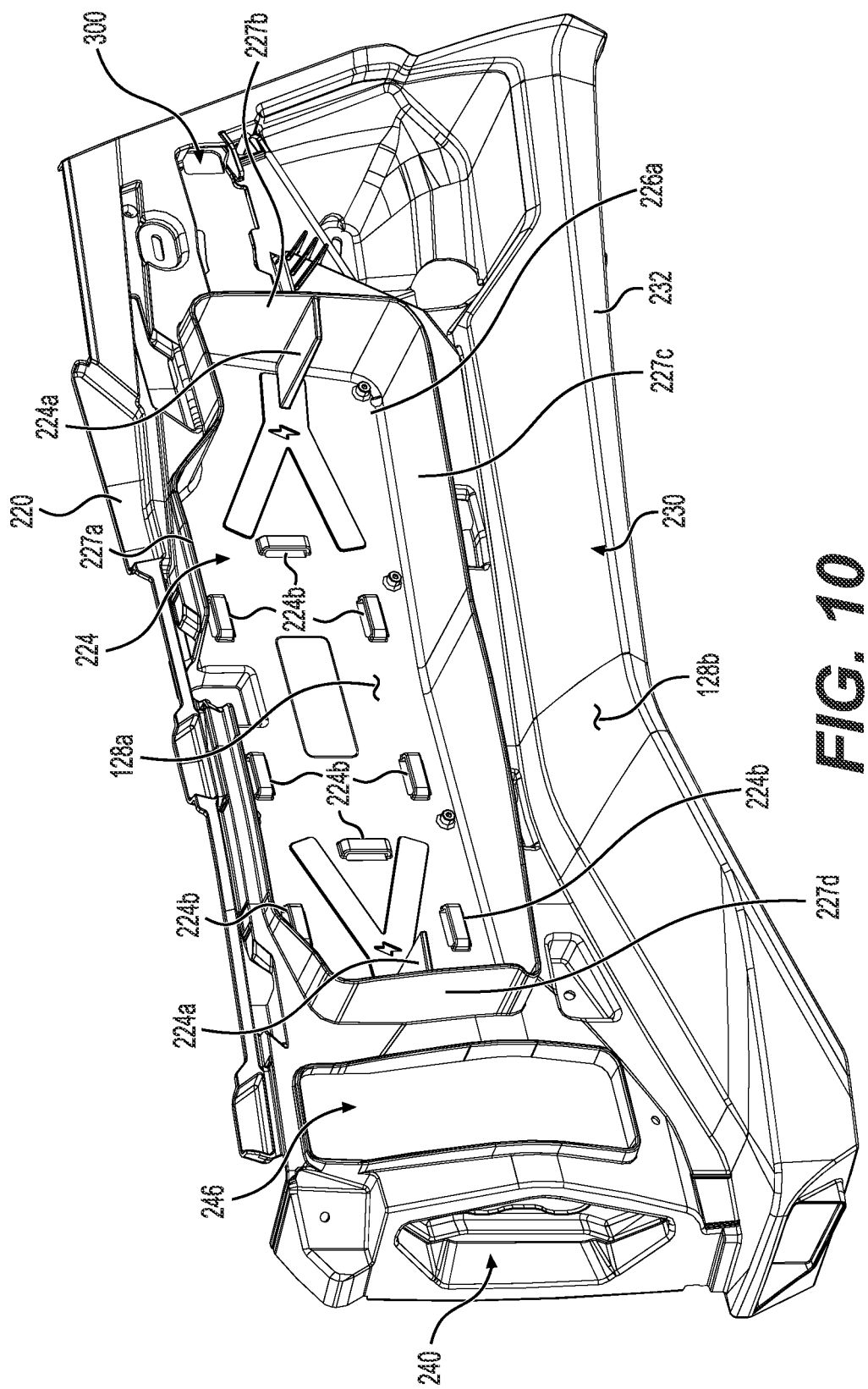
FIG. 10 is a perspective view taken from a top, rear, right side of an inner right panel of the rear cargo box of FIG. 1.
Figure 11:
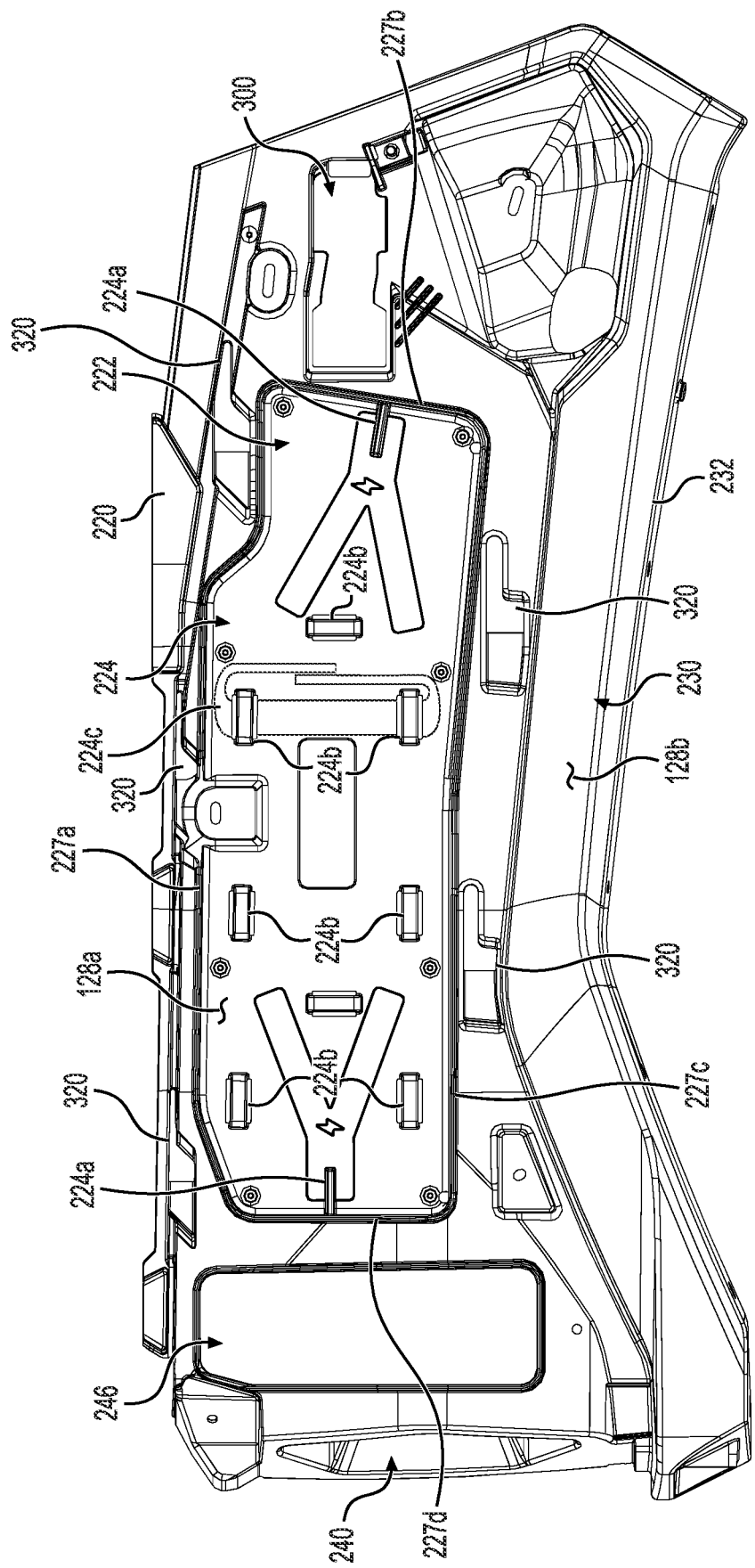
FIG. 11 is a right side elevation view of the inner right panel of FIG. 10.

Referring now to FIGS. 10, 11 and 15A, the cargo box 90 further includes an inner right panel 220 connected to an outer side of the right side wall 110 of the cargo box 90. The inner right panel 220 defines right side storage space 222 on an outer side 226a of the inner right panel 220. More particularly, the right side storage space 222 is defined by a top wall 227a, a front wall 227b, a bottom wall 227c, a rear wall 227d projecting outwardly from the outer side 226a of the inner right panel 220 (FIGS. 10 and 11). The inner right panel 220 further has an accessory holder 224 on the outer side 226a of the inner right panel 220 for receiving an accessory in the right side storage space 222. In the present implementation, the accessory holder 224 is integrally formed with the inner right panel 220, and is adapted to hold booster cables (not shown). The accessory holder 224 thus includes booster cable holders 224a on which the clamps of booster cables can be clamped. The inner right panel 220 also defines a plurality of slots 224b through which loops 224c with hook and loop fasteners (only one loop 224c is shown in FIG. 11) extend to wrap around and hold the booster cables when received in the accessory holder 224. The inner right panel 220 also has an integrally formed portion 230. The integrally formed portion 230 extends below the right side storage space 222 and the accessory holder 224. The integrally formed portion 230 is also vertically lower than the floor 100 of the cargo box 90 (FIGS. 15A and 15B). In the present implementation, the integrally formed portion 230 defines part of a right fender 232 extending above the right rear wheel 48. The integrally formed portion 230 also extends longitudinally in front of and at the rear of the right rear wheel 48. The integrally formed portion 230 thus defines a portion of a right wheel well 234 (FIGS. 1 and 5) in which the right rear wheel 48 can rotate and move up and down together with the right rear suspension assembly 50. Similar to the inner left panel 120, the inner right panel 220 also defines a recess 240 adapted for receiving a right tail light assembly 242 of the vehicle 40 (shown in FIGS. 1 and 5). The recess 240 is defined in a rear face of the inner right panel 220 to receive the right tail light assembly 242, and an aperture 246 is defined in the inner right panel 220 to access the right tail light assembly 242.

Figure 12:
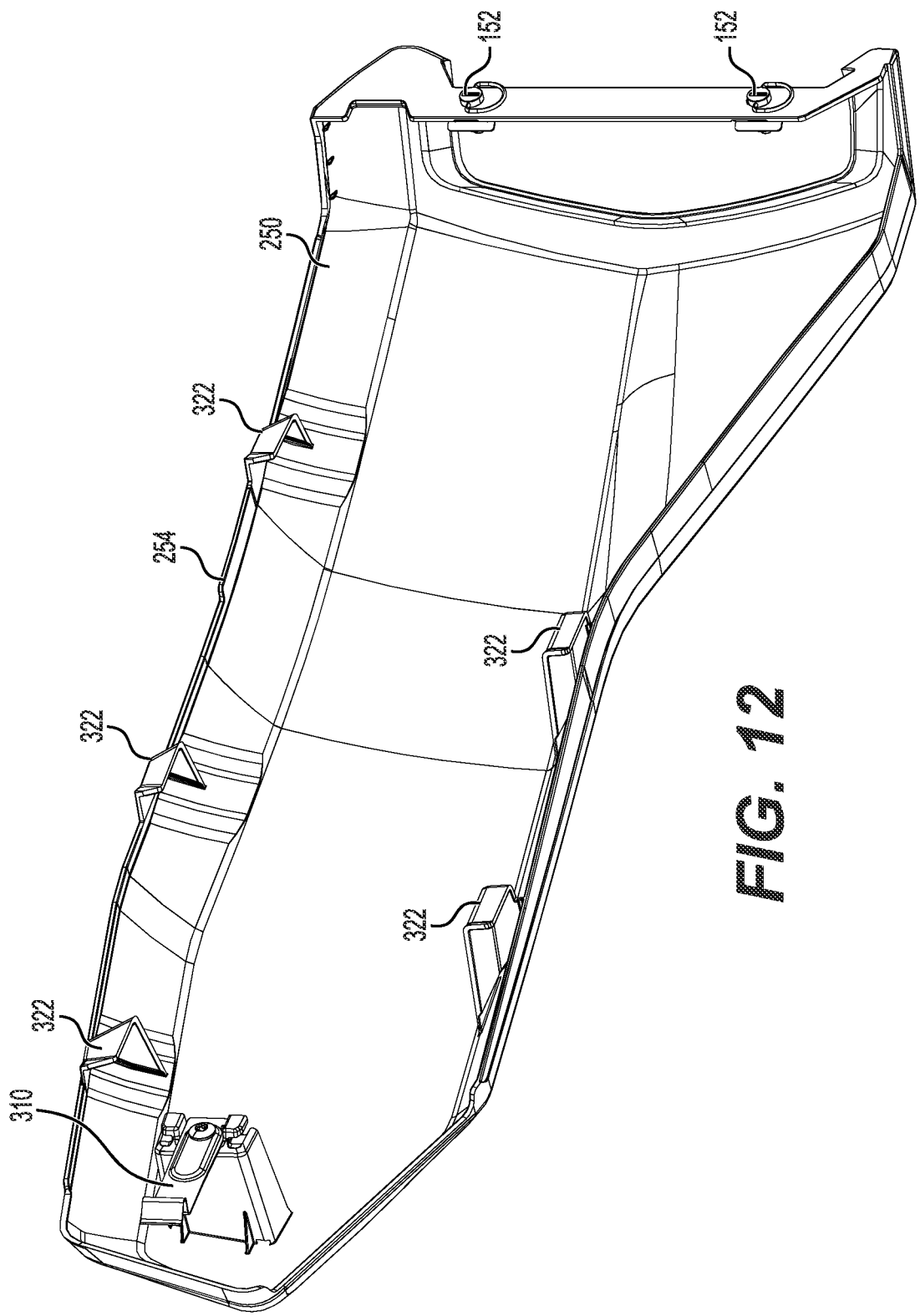
FIG. 12 is a perspective view taken from a front, bottom, left side of an outer right panel of the rear cargo box of FIG. 1.
Figure 13:
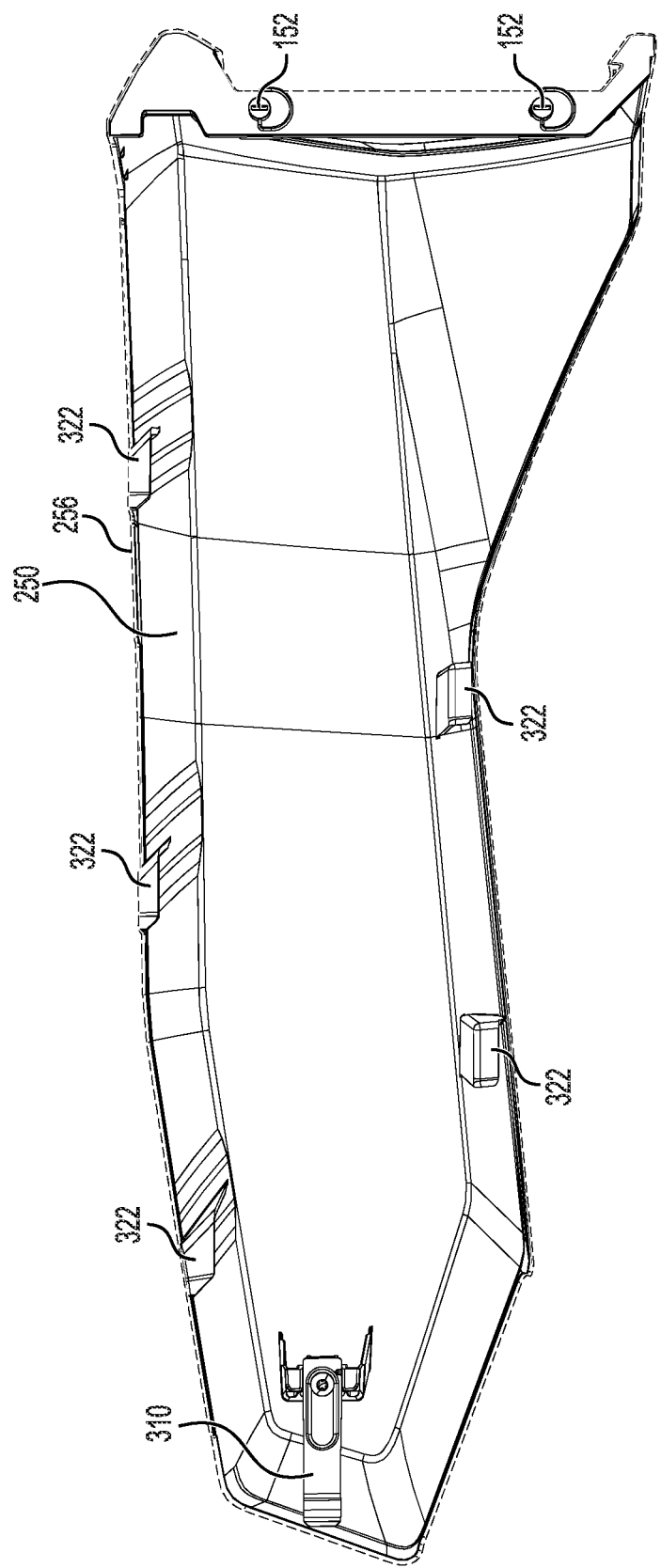
FIG. 13 is a left side elevation view of the outer right panel of FIG. 12.
Figure 14:
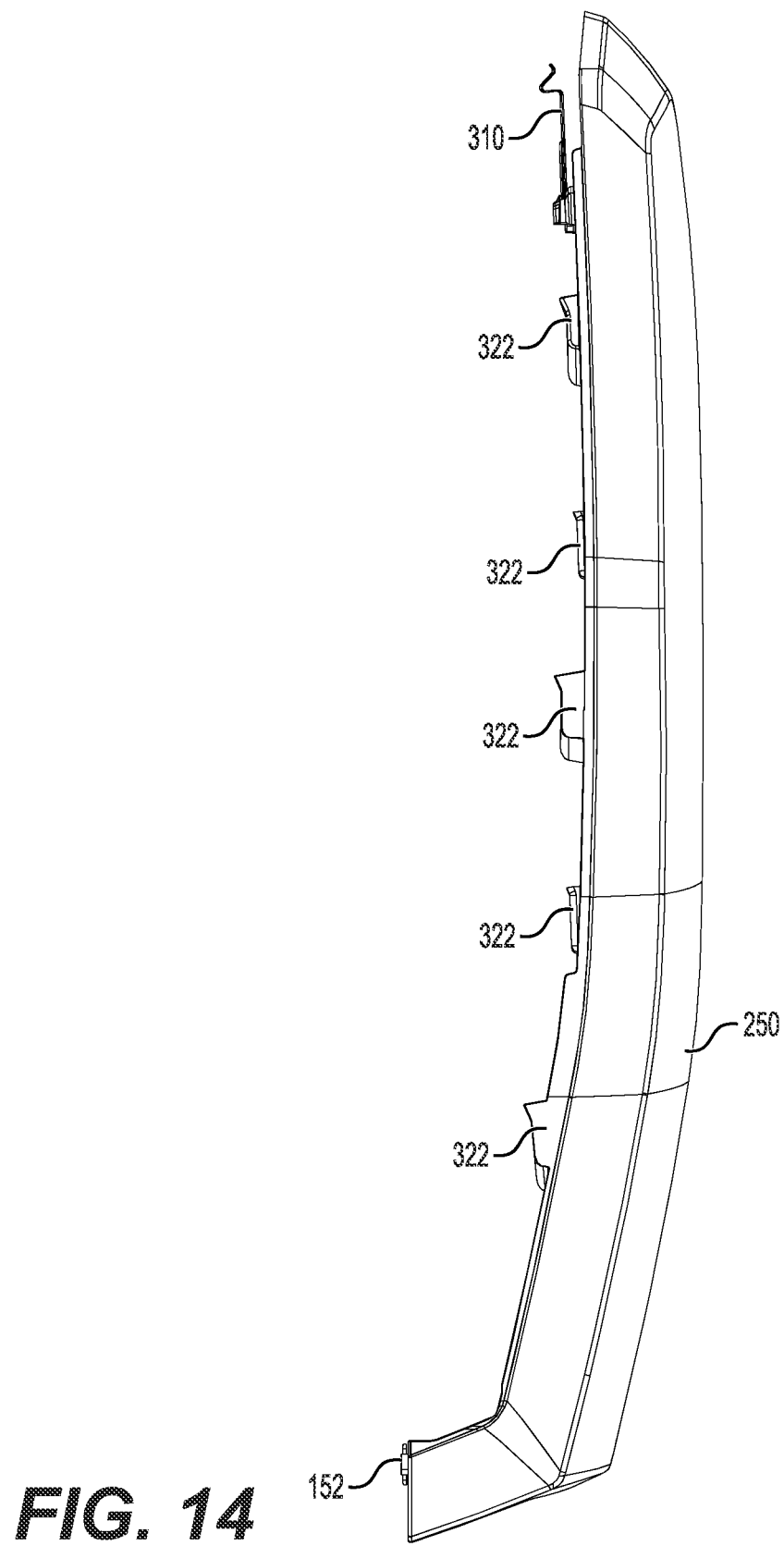
FIG. 14 is a top plan view of the outer right panel of FIG. 12.

Referring to FIGS. 12 to 14, the cargo box 90 further includes an outer right panel 250 removably connected to the inner right panel 220. The connection of the outer right panel 250 to the inner right panel 220 will be described in detail below. The outer right panel 250 is also connected to the right side wall 110 of the cargo box 90 in the present implementation. More particularly, the outer right panel 250 extends around the right tail light assembly 242 and connects to the right side wall 110 at a rear end thereof using two quick release fasteners 152 (FIGS. 5, 12 and 13) that are accessible when the tailgate 114 is moved at least partially in the open position. Conversely, when the tailgate 114 is in the closed position, access to the fasteners 152 is prevented.

Referring to FIGS. 10 to 15B, the outer right panel 250 covers the right side storage space 222 and the accessory holder 224 of the inner right panel 220, and thus further secures the accessory when received in the accessory holder 224. The right side storage space 222 is located laterally outward of the right side wall 110. The right side storage space 222 is suitable to carry the accessory secured in the accessory holder 224 and/or other items. Referring to FIGS. 15A and 15B, when the outer right panel 250 is connected to the inner right panel 220, an inner side 251 of the outer right panel 250 is in close proximity or in abutment with the outer ends of the top wall 227a, the front wall 227b, the bottom wall 227c and the rear wall 227d of the inner right panel 220 defining the right side storage space 222. Therefore, items disposed in the right side storage space 222 are retained therein by the outer right panel 250, and can lie on the bottom wall 227c when the outer right panel 250 is disconnected from the inner right panel 220. The bottom wall 227c thus acts as a floor of the right side storage space 222. An inner edge 254 (FIGS. 12 and 15B) of the outer right panel 250 extends laterally inwards beyond the outer ends of the top wall 227a, the front wall 227b, the bottom wall 227c and the rear wall 227d of the inner right panel 220.

The outer right panel 250 has an outer periphery 256 shown in dashed lines in FIG. 13. The integrally formed portion 230 of the inner right panel 220 extends outside the outer periphery 256 of the outer right panel 250 when the outer right panel 250 is connected to the inner right panel 220. More particularly, the integrally formed portion 230 of the inner right panel 220 extends below the outer right panel 250 when the outer right panel 150 is connected to the inner right panel 220. Furthermore, as can be seen in FIG. 2, the integrally formed portion 230 extends further laterally outward than the outer right panel 250.

The inner right panel 220 and the outer right panel 250 are made of polymeric material using injection molding techniques. Referring to FIGS. 10 and 11 and similar to the inner left panel 120, the portion of the inner right panel 220 defining the accessory holder 224 has the surface finish 128a that is different from the surface finish 128b found in the integrally formed portion 230.

The connection of the outer left panel 150 with the inner left panel 120, and of the outer right panel 250 with the inner right panel 220 will now be described with reference to FIGS. 5, 6, 8, 11, 16A and 16B. The connection features being mirror images of each other, reference will be made to any one of the pairs of panels 120, 150, or 220, 250 interchangeably.

Figure 16A:
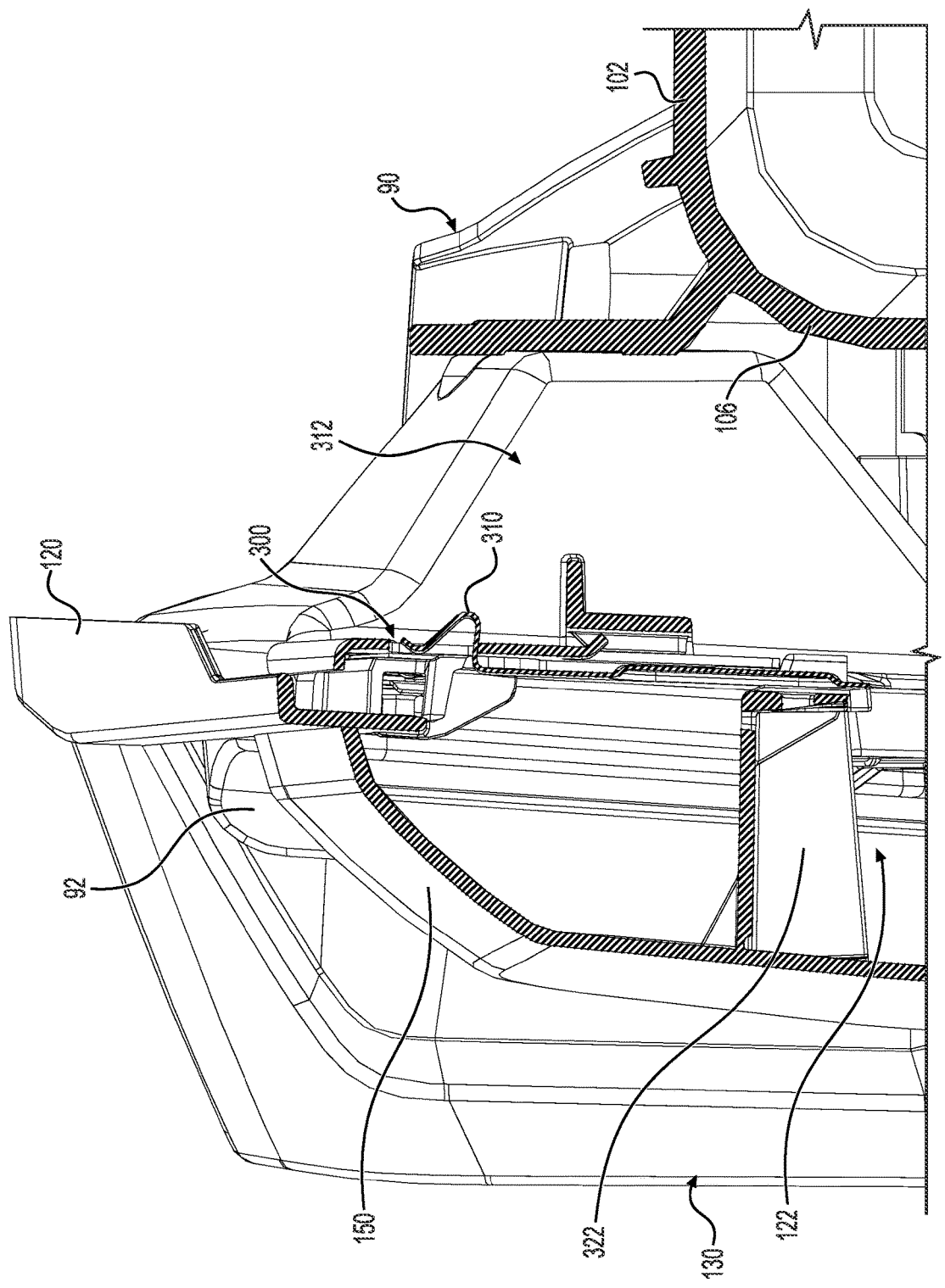
FIG. 16A is an enlarged cross-sectional view of the outer left panel, the inner left panel and other adjacent portions of the cargo box of FIG. 5 taken along cross-section line 16-16 of FIG. 3, with the latch of the outer left panel being in the locked position and engaged in the latch aperture of the inner left panel.
Figure 16B:
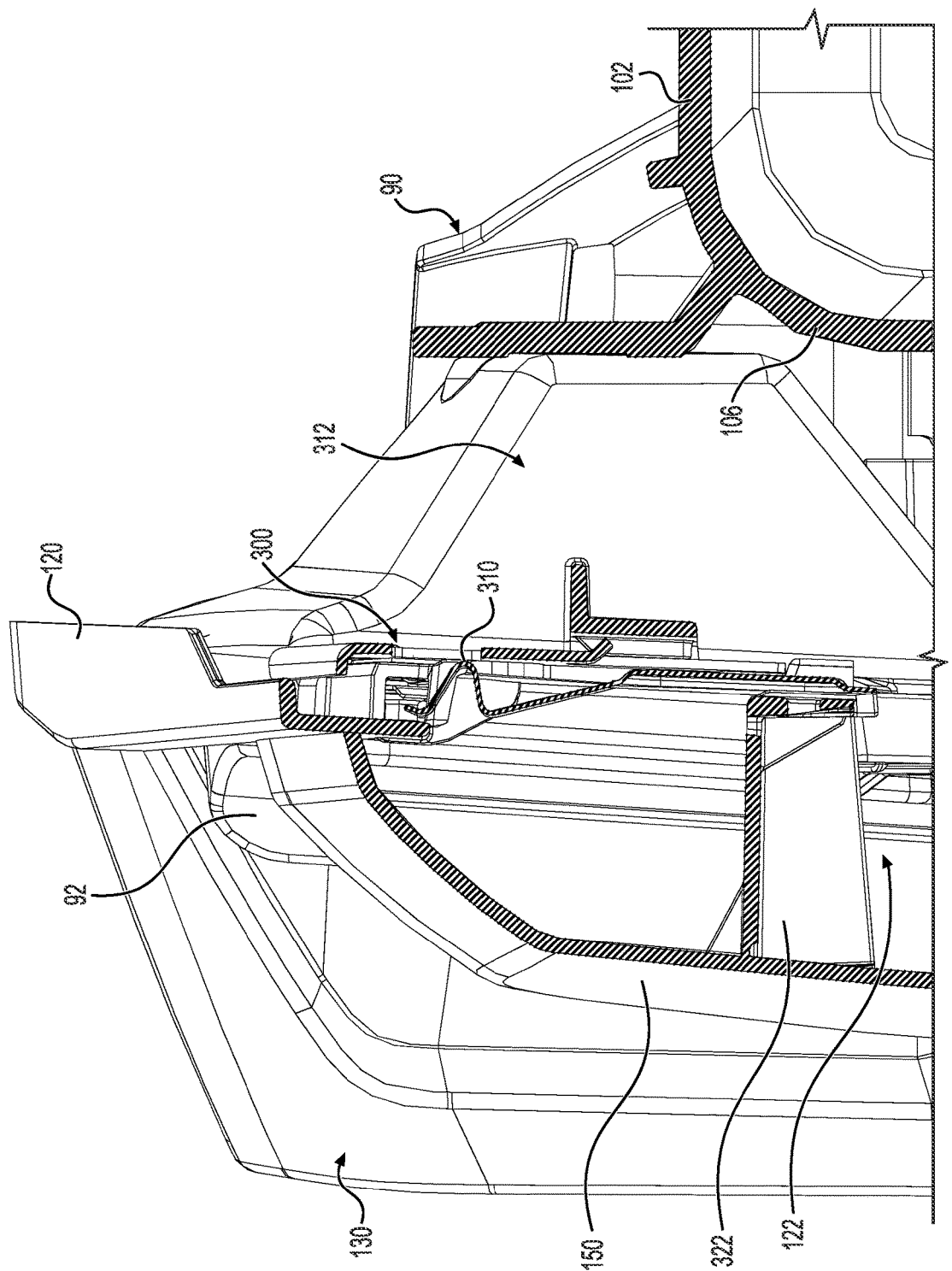
FIG. 16B is an enlarged cross-sectional view of FIG. 16A, with the latch of the outer left panel being in the unlocked position and disengaged from the latch aperture of the inner left panel.

Referring to FIGS. 5 and 6, the inner left panel 120 defines a latch aperture 300. A latch 310 is connected to the outer left panel 150, and a corresponding latch 310 is best seen on the outer panel 250 in FIGS. 12 to 14. The latch 310 is movable between a locked position (FIG. 16A) and an unlocked position (FIG. 16B). The latch 310 is engaged in the latch aperture 300 when in the locked position, and is disengaged from the latch aperture 300 when in the unlocked position. In the present implementation, the latch 310 is resiliently biased toward the locked position and is manually operable to move to the unlocked position. To operate the latch 310, a user inserts one hand in a latch access area 312. Referring to FIGS. 2, 3 and 5, the latch access area 312 is defined above the lever 92 and rearward of the front wall 102 of the cargo box 90. More particularly, the left latch access area 312 is defined rearward of the left air intake grille 82. Referring to FIG. 15A, the latch access area 312 is defined between the inner left panel 120 and the left side wall 106. When the user inserts one hand in the latch access area 312, the user has access to the latch 310 and can move the latch 310 from the locked position (FIG. 16A) to the unlocked position (FIG. 16B).

Figure 8:
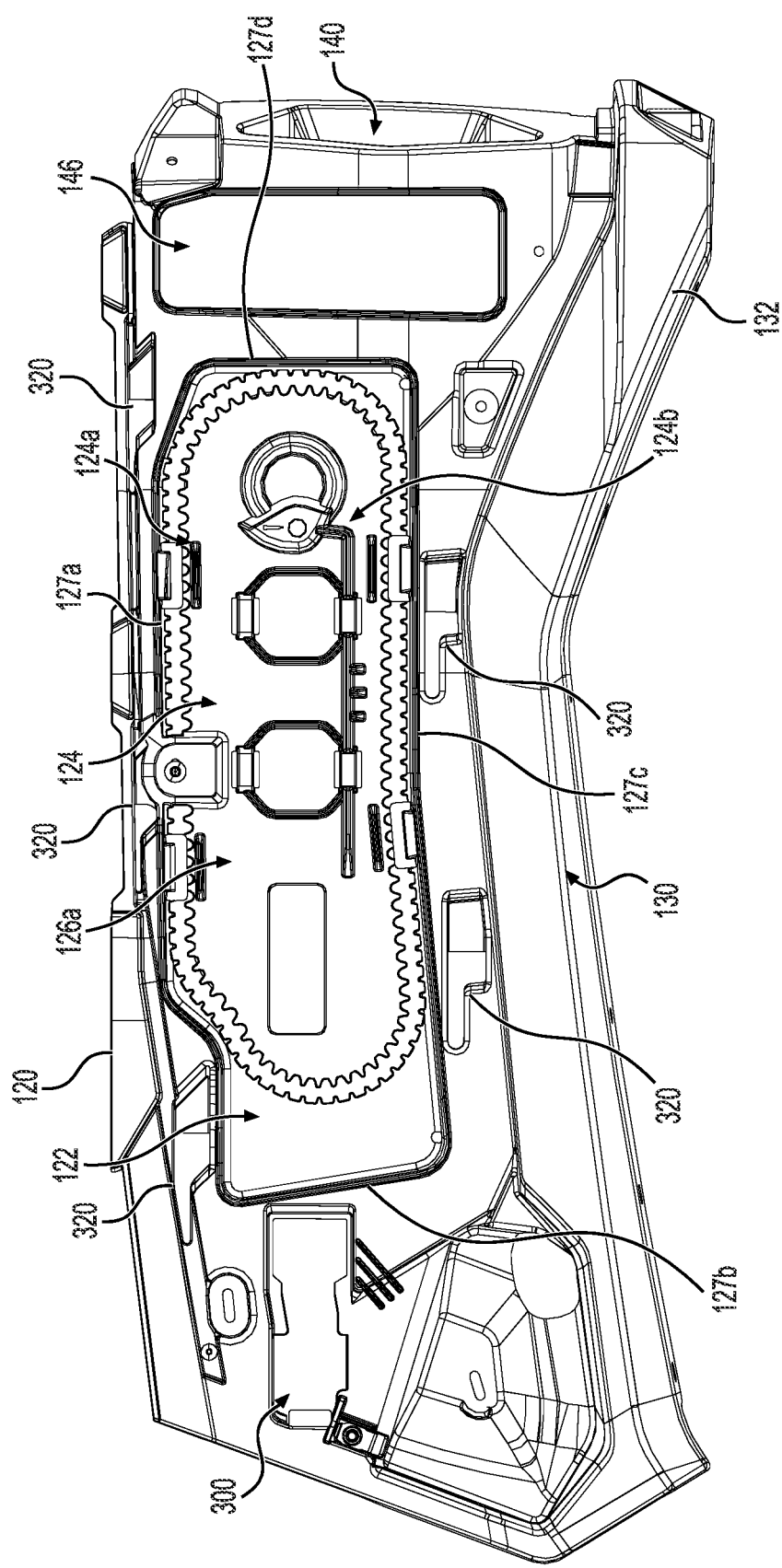
FIG. 8 is a left side elevation view of the inner left panel of FIG. 7.

Referring to FIG. 8, the inner left panel 120 further has five tab apertures 320 defined therein. The inner right panel 220 also has five tab apertures 320 defined therein (FIG. 11). Referring to FIGS. 6 and 12 to 14, the outer panels 150, 250 each have five tabs 322 engageable in the tab apertures 320 of the corresponding inner panel 120, 220. Referring to FIGS. 11 to 13, the tabs 322 are configured such that in order to disconnect the outer right panel 250 from the inner right panel 220, once the latch 310 is moved to the unlocked position, the outer right panel 250 is first moved rearward, and then the outer right panel 250 is pulled away from the inner panel 220. The outer left panel 150 is disconnected from the inner left panel 120 in the same manner.

An illustrative scenario describing the disconnection of the outer left panel 150 from the inner left panel 120 is now provided. To disconnect the outer left panel 150 from the inner left panel 120, the user first opens the tailgate 114 to access the fasteners 152 and unfastens them. It is to be noted that the particular fasteners 152, commonly known a ¼ turn fasteners, used in the present embodiment can be fastened and unfastened without the use of tools. The user then inserts one hand in the left latch access area 312 and moves the left latch 310 in the latch aperture 300 from the locked position (FIG. 16A) to the unlocked position (FIG. 16B). The user holds the outer left panel 150 with his/her other hand and moves the outer left panel 150 rearward to disengage the tabs 322 from the tab apertures 320. The user then pulls the outer left panel 150 away from the inner left panel 120. Access to the left side storage space 122 and accessory holder 124 is thus granted. Fasteners 152 are preferably secured to the left outer panel 150 so as to be removed therewith and remain secured thereto. It is also contemplated that the user can reinstall the fasteners 152 on the inner left panel 130 so as to not lose them.

Conversely, in order to reconnect the disconnected outer left panel 150 to the inner left panel 120, the user positions the outer left panel 150 relative to the inner left panel 120 to engage the tabs 322 in the tab apertures 320. The user moves the outer left panel 150 forward so as to move the tabs 322 forward in the tab apertures 320 until the latch 310 is engaged in the latch aperture 300 in the locked position. If that has not already been done, the tailgate 114 is moved in the open position and the fasteners 152 are connected to the left side wall 106 and to the outer left panel 150. The outer left panel 150 is thus connected to the inner left panel 120 and to the left side wall 106. The tailgate 114 can then be closed to prevent access to the fasteners 152. The connection and disconnection of the outer left panel 150 to/from the inner left panel 120 is thus performed without using tools. The connection and disconnection of the outer right panel 250 to/from the inner right panel 220 is performed in the same manner.

Referring to FIGS. 5, 11 and 13, it is to be noted that the location of the latch 310, the tabs 320, and the fasteners 152 on the outer panels 150, 250 is selected to be outside the respective storage space 122, 222 the outer panels 150, 250 are covering. In other words, because the outer panels 150, 250 are removably connected, at least one of the latch 310, the tabs 320, and the fasteners 152 are placed on each side of the respective storage space 122, 222 in order for the corresponding outer panel 150, 250 to be well connected all around it. In the present implementation, each latch 310 is located in front of the corresponding storage space 122, 222, the tabs 320 are located above and below the corresponding storage space 122, 222, and the fasteners 152 are located at the rear of the corresponding storage space 122, 222.

Figure 17:
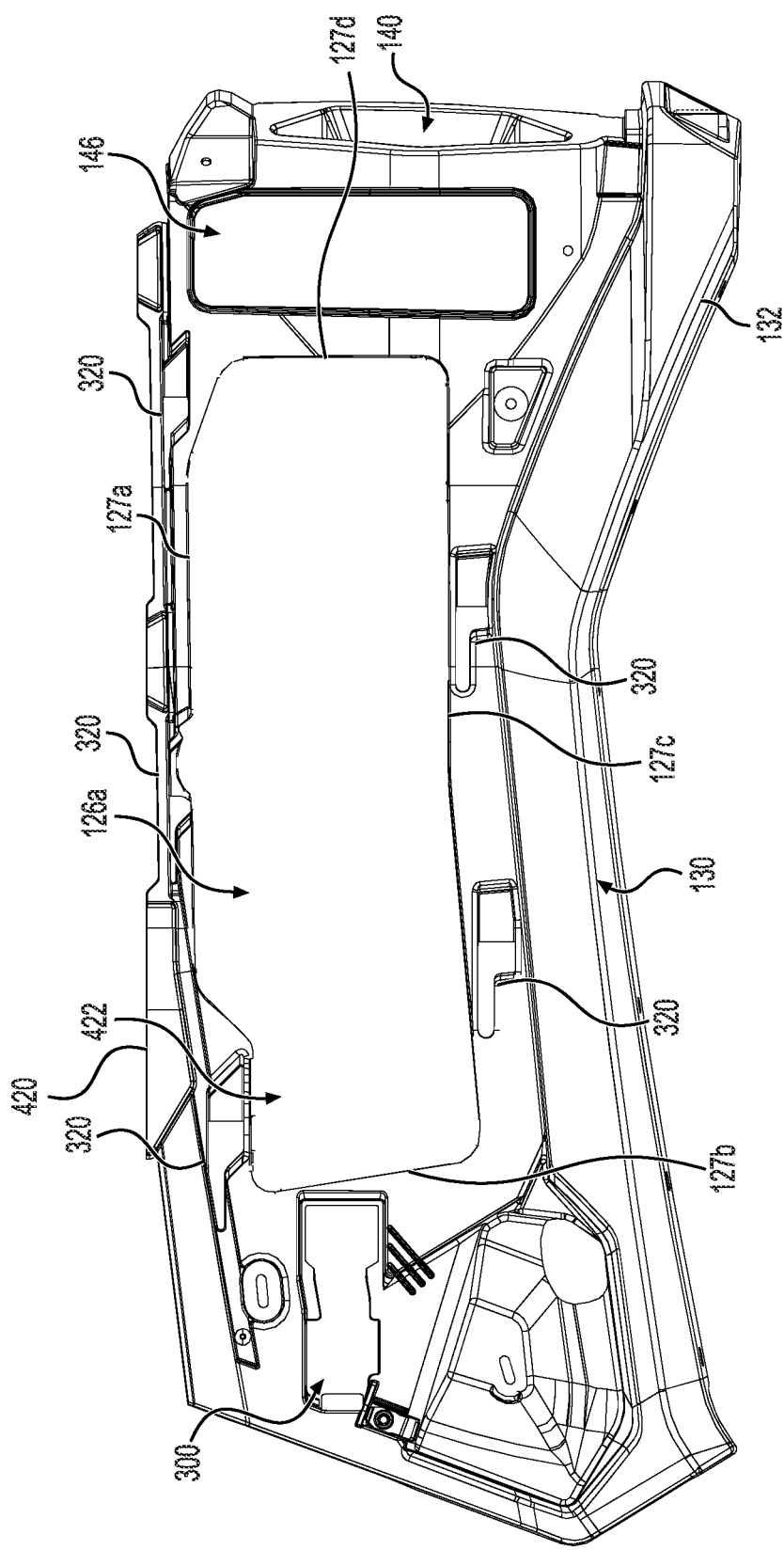
FIG. 17 is a left side elevation view of an alternate implementation of an inner left panel for the rear cargo box of FIG. 1.

Referring to FIG. 17, an alternate implementation of the inner left panel 120 is shown. The inner left panel 420 shown in FIG. 17 has same or similar features as the inner left panel 120, and these features have been labeled with the same reference numerals.

The inner left panel 420 differs from the inner left panel 120 in that the inner left panel 420 defines a left storage space 422 that is free of an accessory holder. The left storage space 422 can thus be used for carrying cargo or other accessories.

Figure 18:
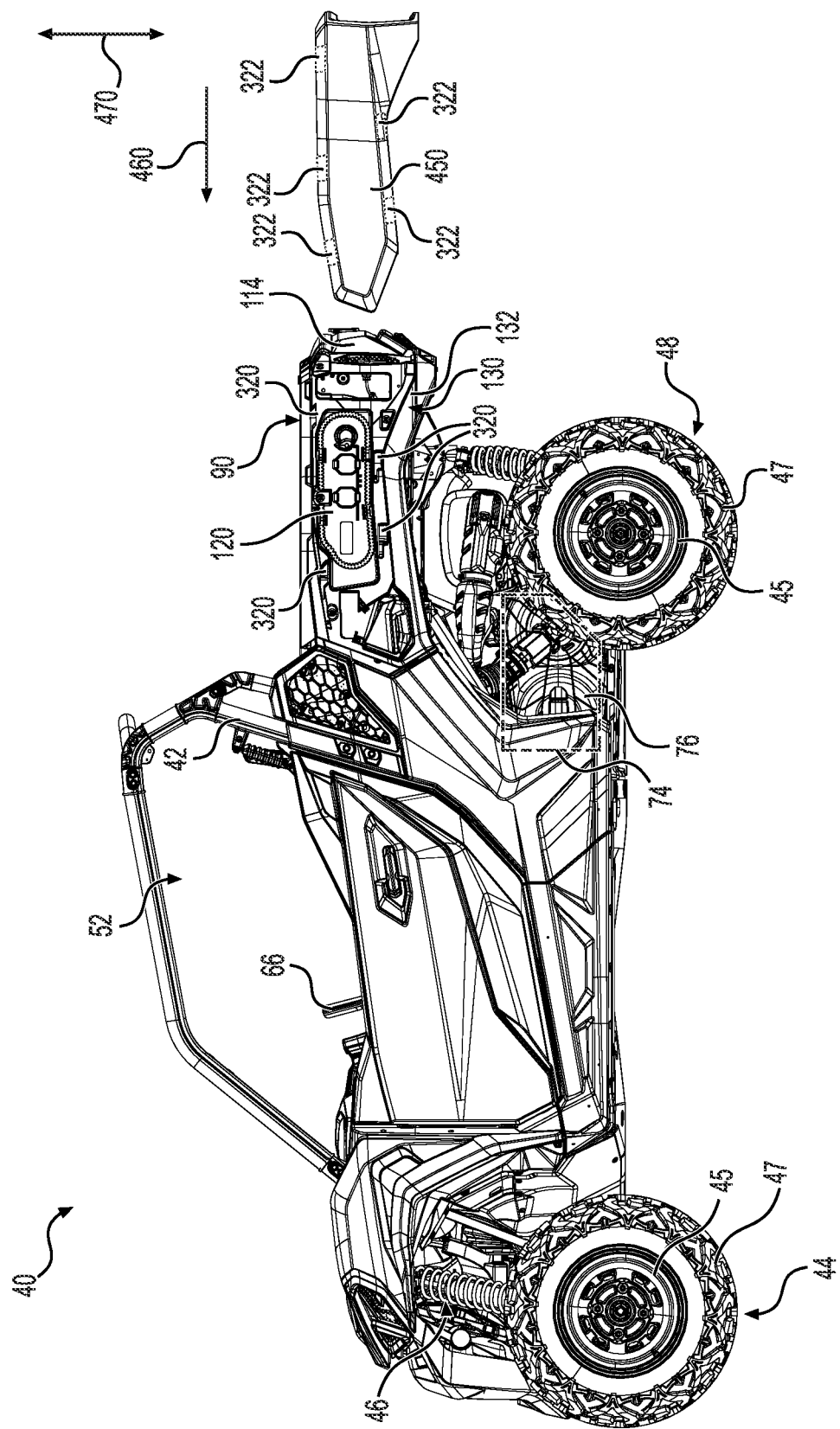
FIG. 18 is a left side elevation view of the vehicle of FIG. 1, with an alternate implementation of an outer left panel for the rear cargo box of FIG. 1.

Referring to FIG. 18, an alternate implementation of the outer left panel 150 is shown. The outer left panel 450 shown in FIG. 18 has similar features as the outer left panel 150, such as the tabs 322 (schematically shown in phantom lines in FIG. 18), and these features will be referred to as using the same reference numerals as in the outer left panel 150. The tabs 322 of the outer left panel 450 are oriented and configured for removing the outer left panel 450 after (i) having moved the left latch 310 from the locked position to the unlocked position, and (ii) by moving the outer left panel 450 forward as indicated by arrow 460 in FIG. 18. In other words, the tabs 322 and the tab apertures 320 of the inner left panel 120 are oriented differently than the ones presented in the outer left panel 150 and the inner left panel 120 respectively so as to allow removal of the outer left panel 450 by forward motion. Furthermore, as indicated by double arrow 470 in FIG. 18, it is contemplated that, in yet other implementations, the tabs 322 of the outer left panel 450 and the tab apertures 320 of the inner left panel 120 could be oriented and configured so as to allow removal of the outer left panel 450 by upward or downward motion after having moved the left latch 310 from the locked position to the unlocked position.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An off-road vehicle comprising:
a frame;
a motor connected to the frame;
a plurality of ground engaging members operatively connected to the frame, at least one ground engaging member of the plurality of ground engaging members being operatively connected to the motor;
a cargo box connected to the frame, the cargo box having a floor, a front wall extending upwardly from a front end of the floor, a left side wall extending upwardly from a left side of the floor, a right side wall extending upwardly from a right side of the floor, the cargo box further comprising:
an inner panel connected to one of the left side wall and the right side wall of the cargo box, the inner panel defining a side storage space on an outer side of the inner panel; and
an outer panel removably connected to the inner panel, the outer panel covering the side storage space, the outer panel having an outer periphery, and an integrally formed portion of the inner panel extends outside the outer periphery of the outer panel.

2. The off-road vehicle of claim 1, wherein the integrally formed portion of the inner panel:
extends below the side storage space;
extends below the outer panel when the outer panel is connected to the inner panel; and
is vertically lower than the floor of the cargo box.

3. The off-road vehicle of claim 1, wherein the integrally formed portion of the inner panel defines at least in part a fender extending above a rear ground-engaging member of the plurality of ground-engaging members.

4. The off-road vehicle of claim 3, wherein the inner panel extends longitudinally in front of and at the rear of the rear ground engaging member of the plurality of ground-engaging members.

5. The off-road vehicle of claim 1, wherein:
the inner panel defines a latch aperture;
the off-road vehicle further comprises:
a latch movable between a locked position and an unlocked position, the latch being connected to the outer panel, the latch being engageable in the latch aperture of the inner panel when in the locked position for securing the outer panel to the inner panel;
the latch is resiliently biased toward the locked position; and
the latch is a manually operable latch.

6. The off-road vehicle of claim 5, wherein a latch access area is defined rearward of the front wall of the cargo box and between the inner panel and the one of the left and right side walls of the cargo box, the latch access area providing access to move the latch between the locked position and the unlocked position.

7. The off-road vehicle of claim 5, further comprising at least one fastener selectively connecting the outer panel to the one of the left and right side walls of the cargo box; and
wherein the cargo box further includes a tailgate movable between an open position and a closed position, and the at least one fastener is accessible for being unfastened when the tailgate is in the open position, and the tailgate prevents access to the fastener when in the closed position.

8. The off-road vehicle of claim 5, wherein:
the inner panel has at least one tab aperture defined therein;
the outer panel further includes at least one tab engageable in the at least one tab aperture of the inner panel; and
the at least one tab aperture and the at least one tab are configured such that in order to disconnect the outer panel from the inner panel, the outer panel is moved to disengage the at least one tab from the at least one tab aperture of the inner panel before the outer panel is pulled away from the inner panel.

9. The off-road vehicle of claim 8, wherein the at least one tab aperture and the at least one tab are configured such that in order to disengage the at least one tab from the at least one tab aperture, the outer panel is moved rearward.

10. The off-road vehicle of claim 8, wherein the at least one tab aperture and the at least one tab are configured such that the at least one tab is disengaged from the at least one tab aperture by forward motion of the outer panel.

11. The off-road vehicle of claim 8, further comprising at least one fastener selectively connecting the outer panel to the one of the left and right side walls of the cargo box, and
wherein the latch, the at least one fastener and the at least one tab are provided on the outer panel so as to be located on each side of the side storage space when the outer panel is connected to the inner panel.

12. The off-road vehicle of claim 1, wherein the inner panel defines a recess adapted for receiving a light assembly of the off-road vehicle.

13. The off-road vehicle of claim 1, wherein the inner panel further includes an accessory holder in the side storage space for receiving an accessory.

14. The off-road vehicle of claim 13, wherein the accessory holder is integrally formed with the inner panel.

15. The off-road vehicle of claim 14, wherein the accessory holder includes at least one of a belt holder, a booster cable holder, and a tool holder.

16. The off-road vehicle of claim 1, wherein:
the inner panel is an inner left panel;
the side storage space is a left side storage space;
the outer panel is an outer left panel;
the one of the left and right side walls is the left side wall of the cargo box; and
the cargo box further comprises:
an inner right panel connected to the right side wall of the cargo box, the inner right panel defining a right side storage space on an outer side of the inner right panel, and
an outer right panel removably connected to the inner right panel, the outer right panel covering the right side storage space, the outer right panel having an outer periphery, and an integrally formed portion of the inner right panel extends outside the outer periphery of the outer right panel.

17. The off-road vehicle of claim 16, wherein the inner right panel further includes a right accessory holder in the right side storage space.

18. The off-road vehicle of claim 17, wherein the right accessory holder is integrally formed with the inner right panel.

19. The off-road vehicle of claim 16, wherein the outer right panel is also connected to the right side wall of the cargo box.

20. The off-road vehicle of claim 1, wherein the frame defines at least in part a cockpit area and a power pack area, the power pack area being disposed rearward of the cockpit area, and the motor is disposed in the power pack area.

* * * * *